United States Patent [19]
Bottomley et al.

[11] Patent Number: 5,508,732
[45] Date of Patent: Apr. 16, 1996

[54] DATA SERVER, CONTROL SERVER AND GATEWAY ARCHITECTURE SYSTEM AND METHOD FOR BROADCASTING DIGITAL VIDEO ON DEMAND

[75] Inventors: John F. Bottomley, Vienna; Henry D. Chadwick, Herndon, both of Va.; James M. Hall, Baltimore, Md.; Frank R. Moore, Waccabuc, N.Y.; John T. Powers, Jr., Morgan Hill, Calif.; Marc A. Putterman, New York, N.Y.; Mark L. Schaszberger, Gaithersburg, Md.; Robin Williams, San Jose, Calif.; Robert W. Withers, Leesburg, Va.

[73] Assignee: International Business Machines Corporation, Armonk, N.Y.

[21] Appl. No.: 34,311

[22] Filed: Mar. 22, 1993

[51] Int. Cl.⁶ .................................................. H04N 7/173
[52] U.S. Cl. ........................................... 348/7; 348/12
[58] Field of Search ................................ 348/6, 7, 8, 12, 348/13, 714, 715; 455/3.1, 3.2, 4.1, 4.2; H04N 7/16, 7/14, 7/173, 7/10

[56] References Cited

U.S. PATENT DOCUMENTS

| | | |
|---|---|---|
| 4,381,522 | 4/1983 | Lambert . |
| 4,931,950 | 6/1990 | Isle et al. . |
| 4,995,078 | 2/1991 | Monslow et al. . |
| 5,153,726 | 10/1992 | Billing .................................. 348/716 |
| 5,341,474 | 8/1994 | Gelmon et al. ............................ 348/7 |
| 5,442,389 | 8/1995 | Blohut et al. .............................. 348/7 |
| 5,442,390 | 8/1995 | Hooper et al. ............................. 348/7 |

FOREIGN PATENT DOCUMENTS

| | | |
|---|---|---|
| 0122192 | 7/1984 | Japan . |
| 0205691 | 8/1989 | Japan ........................... H04N 7/173 |
| 0068288 | 3/1991 | Japan ........................................ 348/7 |

OTHER PUBLICATIONS

Batalden, et al., "Compressed Sequential Data on a Fixed Block Device," IBM Technical Disclosure Bulletin, Feb. 1991, pp. 158–164.
Sincoskie, W. D. "Video on Demand: Is It Feasible?" IEEE 1990 pp. 305.3.1–305.3.5.

*Primary Examiner*—David E. Harvey
*Attorney, Agent, or Firm*—Bernard M. Goldman

[57] ABSTRACT

A data processing system is described for providing digital video information on subscriber demand, for very large video data files. The system enables rapid response to the requests by network subscribers, independent of the number of video files offered for selection. The data processing system is coupled through a data switch to a subscriber communications network.

20 Claims, 26 Drawing Sheets

DATA SERVER, CONTROL SERVER AND GATEWAY ARCHITECTURE SYSTEM AND METHOD FOR BROADCASTING DIGITAL VIDEO ON DEMAND

BACKGROUND OF THE INVENTION

1. Technical Field

The invention disclosed broadly relates to data processing systems and methods and more particularly relates to broadcasting large digital files to subscribers on demand in a subscriber network.

2. Background Art

There has been a strong trend in recent years toward the conversion of still pictures and full motion video into digital form. This trend has been driven to some extent by the need to provide images and full motion video on compact disk read only memory units to support the entertainment and home computer market. The increasing use of digitized video has been accompanied by the interest of various industry groups such as the Motion Picture Experts Group (MPEG), to develop standards for digital video compression, making it practical to handle full motion video over narrow band channels. The MPEG video compression/decompression algorithms provide a suitable compression for the information in digital video recordings, enabling their storage in compact form on digital storage media.

As digital video becomes more available, new methods of handling movies and their distribution must be implemented to adequately compete with existing distribution channels. Video storage has traditionally been provided in analog or digital form by video tape. This has led to an industry built around that technology, network television, cable TV, video rental stores and the like. Network TV and cable TV have used "a broadcast" medium where the consumer is locked into time schedules which are predetermined by the service packager. Video rental stores have provided additional convenience to the consumer by providing movies that the consumer wishes to see at the time the consumer wishes to see them, or video on demand. What is needed is a broadcast medium where the consumer is not locked into a time schedule which is predetermined by the service packager.

OBJECTS OF THE INVENTION

It is therefore an object of the invention to provide an improved system and method for providing video presentations on demand to subscribers in a subscriber network.

It is another object of the invention to provide an improved digital video server in which a stored video can be played with different starting times, simultaneously for many subscribers in a network.

It is another object of the invention to provide an improved digital video server which is fully automated so that subscribers can operate it via remote control from a subscriber network.

It is a further object of the invention to provide an improved digital video server which can be expanded to handle a large number of ports corresponding to a correspondingly large number of unique video feeds, to provide a broad selection to the subscriber a large number of video presentations.

It is a further object of the invention to provide an improved digital video server which is compatible with a variety of interfaces and a variety of methods of distribution of video presentations to subscribers in a subscriber network.

It is still a further object of the invention to provide an improved digital video server which is capable of highly reliable, continuous service.

It is yet a further object of the invention to provide an improved digital video server which includes subscriber billing and record keeping.

SUMMARY OF THE INVENTION

These and other objects, features and advantages are accomplished by the data processing invention disclosed herein. A data processing system is disclosed for providing digital video information on subscriber demand, for very large video data files. The system enables rapid response to the requests by network subscribers, independent of the number of subscribers or the number of video files offered for selection. The data processing system is coupled through a data switch to a subscriber communications network.

The system includes a gateway coupled to the network, a control server coupled to the gateway and a data server coupled to the control server and to the data switch. The data server manages a large number of large sized video data files containing video programming data which is to be broadcast to requesting subscribers over the communications network.

The data processing system executes stored program instructions to provide digital video information on subscriber demand. The system will receive a request in the gateway from a subscriber. It responds by sending the subscriber ID and video ID to the control server. The control server will determine if a subscriber queue exists in the control server for this video ID and is accepting new subscribers. If it is, then the control server will assign the subscriber ID to the subscriber queue and send a video confirmation, port ID and start time to the gateway. The gateway sends the port ID and the subscriber ID to the data switch to connect the port to the subscriber. It response to the subscriber with the short time.

If a queue timer for the subscriber queue in the control server has not timed out, then the system waits for another the subscriber request. If any queue has timed out, then the system begins the data server output. The control server gets the video file address and port ID for the subscriber queue and sends them to the data server. The data server loads the first page of video data into an A-buffer and second page of data into a B-buffer from the video storage using the video file address and it stores a next video store accessing address. The data server connects the output for the A-B buffers to the port ID. The data server then begins outputting the A-buffer to the port ID at the start time, sending a data stream to the data switch. When the A-buffer is empty, the data server begins outputting the B-buffer to the port ID and reloads the A-buffer by accessing a next page of video data from the video store using the next video store accessing address. The data server continues sending A-buffer and B-buffer pages of continuous, serialized video data to the data switch until an end-of-file is detected in the video data. Then, the data server sends a termination message to the control server. The control server forwards a termination message to the gateway. The gateway forwards a termination message to the data switch to release the port connections to the subscribers who were receiving the broadcast.

The data server can consecutively access the same video file in consecutive queue timer intervals corresponding to a plurality of subscriber queues. In this manner, several video feeds of the same video file can be broadcast simultaneously, with their start times staggered.

In an additional feature, the step of receiving the request in the gateway, can include additional steps. The gateway will respond with the voice response unit in the gateway, receive the subscriber ID and video ID, validate the subscriber ID, access a gateway video catalog using the video ID for voice response data describing the video and respond to the subscriber with voice response data.

If the queue timer in the control server has timed out, the method includes additional steps. If no the subscriber queue exists for the video ID, then the control server will determine if a new port is available. If a new port is available, then the control server will create a new the subscriber queue in the control server, start a queue timer for adding more subscribers and schedule the requested video for the port ID at a start time. The control server will then assign the subscriber ID to the subscriber queue and send a video confirmation, the port ID and the start time to the voice response unit in the gateway. The gateway sends the port ID and the subscriber ID to the data switch to connect the port to the subscriber's network line. If queue timer in the control server has not timed out, then the subscriber queue is still accepting more subscribers and the system waits for another the subscriber request. Otherwise it begins the data server output.

The interval set for the queue timer is typically short, so that subscribers never have to wait more than a few minutes for the video to start. Once a first queue timer closes a first subscriber queue, the next subscriber is assigned to a new subscriber queue for the next broadcast of the video file, which will start after another queue timer interval. Thus, subscriber demand controls when the video files are broadcast.

The resulting data processing system provides digital video information on subscriber demand, for very large video data files. The system enables rapid response to the requests by network subscribers, independent of the number of subscribers or the number of video files offered for selection.

DESCRIPTION OF THE FIGURES

These and other objects, features and advantages can be more fully appreciated with reference to the accompanying figures.

DISCUSSION OF THE PREFERRED EMBODIMENT

Once a movie is compressed and converted into digital form, it takes on the characteristics of a large sequential digital file which is conveniently handled by data processing equipment and methods. As a data file, a video can be stored, manipulated and played back on a computer in much the same way as text files. The invention disclosed herein is a video server which includes a gateway, a control server and a data server, which are designed to work with MPEG compressed data transmitted at a T1 (1.544 megabit per second) data rate. MPEG (Motion Picture Experts Group) is the organization that defines the video compression/decompression algorithms hereinafter referred to as the MPEG compression algorithms. The term T1 refers to a U.S. Digital Trunking Facility Standard, capable of transmitting and receiving 24 digitized voice or data channels. Signaling is embedded in the voice channel transmission. The transmission rate is 1.544 megabits per second. The T1 standard is supported by the telephone industry and it can also be carried by cable and satellite carriers. The quality of the received and decoded video from the MPEG decompression algorithm, has the appearance of the quality of a video played back on a video cassette recorder (VCR). In the invention disclosed herein, the video server employs magnetic disk drives for storage of the compressed video files. The compressed and digitized video is written from tape or optical disk onto magnetic disks as long sequential files. When a request for a particular video is received by the video server, the file containing the video is sequentially read and placed into a transmit buffer. The video is then clocked from the buffer synchronously to the network at a 1.544 megabit per second rate. At the subscriber end of the network link, a decoder unit converts the digital signal, using the MPEG decompression algorithm, to recover a standard television NTSC signal that can be handled by a conventional television set.

Figure 1:
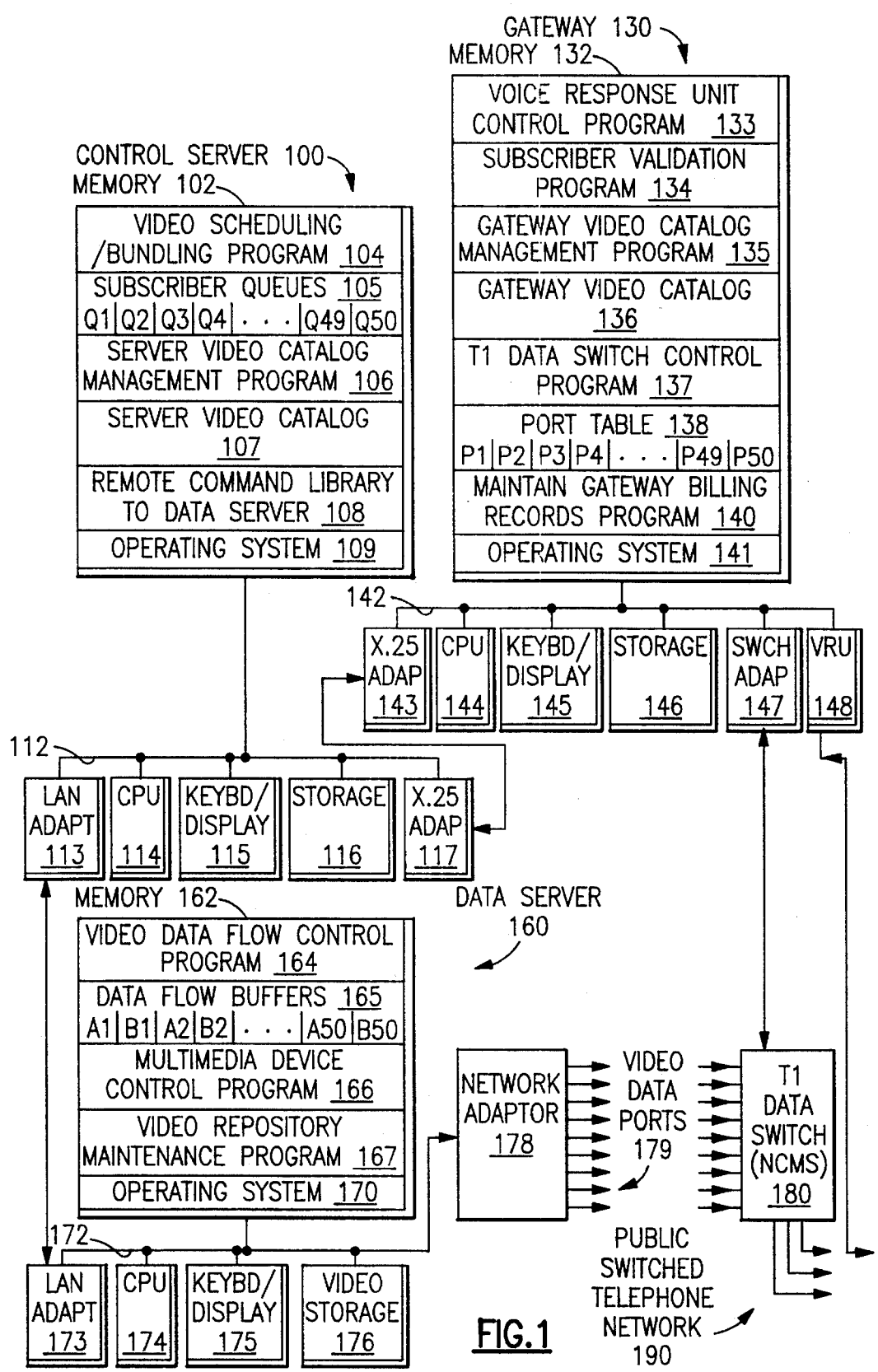
FIG. 1 is an overall architecture diagram of the system invention.

FIG. 1 is an overall functional block diagram of the video server invention. The video server invention includes the gateway 130 which is coupled through the voice response unit 148 to the public switched telephone network 190, to receive subscriber requests for videos. The gateway 130 also has control connections through adapter 147 to a T1 data switch 180 to the public switched telephone network 190. The control server 100 is coupled to the gateway 130 and receives subscriber requests from the gateway 130 for scheduling requested video presentations. The data server 160 is coupled to the control server 100 and receives control signals from the control server 100 and in response, broadcasts to the T1 data switch 180, the requested video presentation, with a minimum of time delay following the subscriber's demand.

Figure 2A:
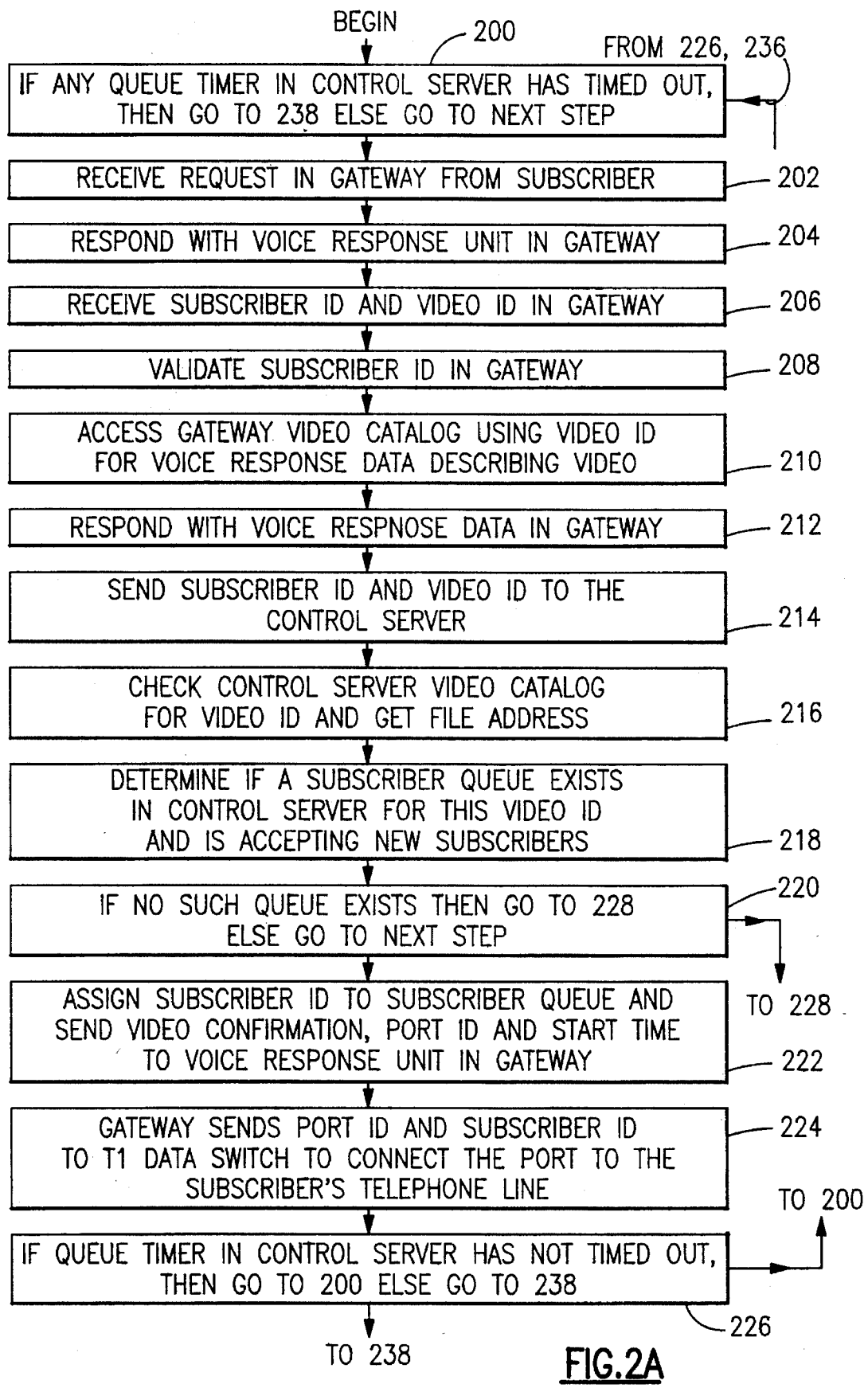
FIGS. 2A, 2B and 2C represent a flow diagram of a sequence of operational steps for the method of the invention.
Figure 2B:
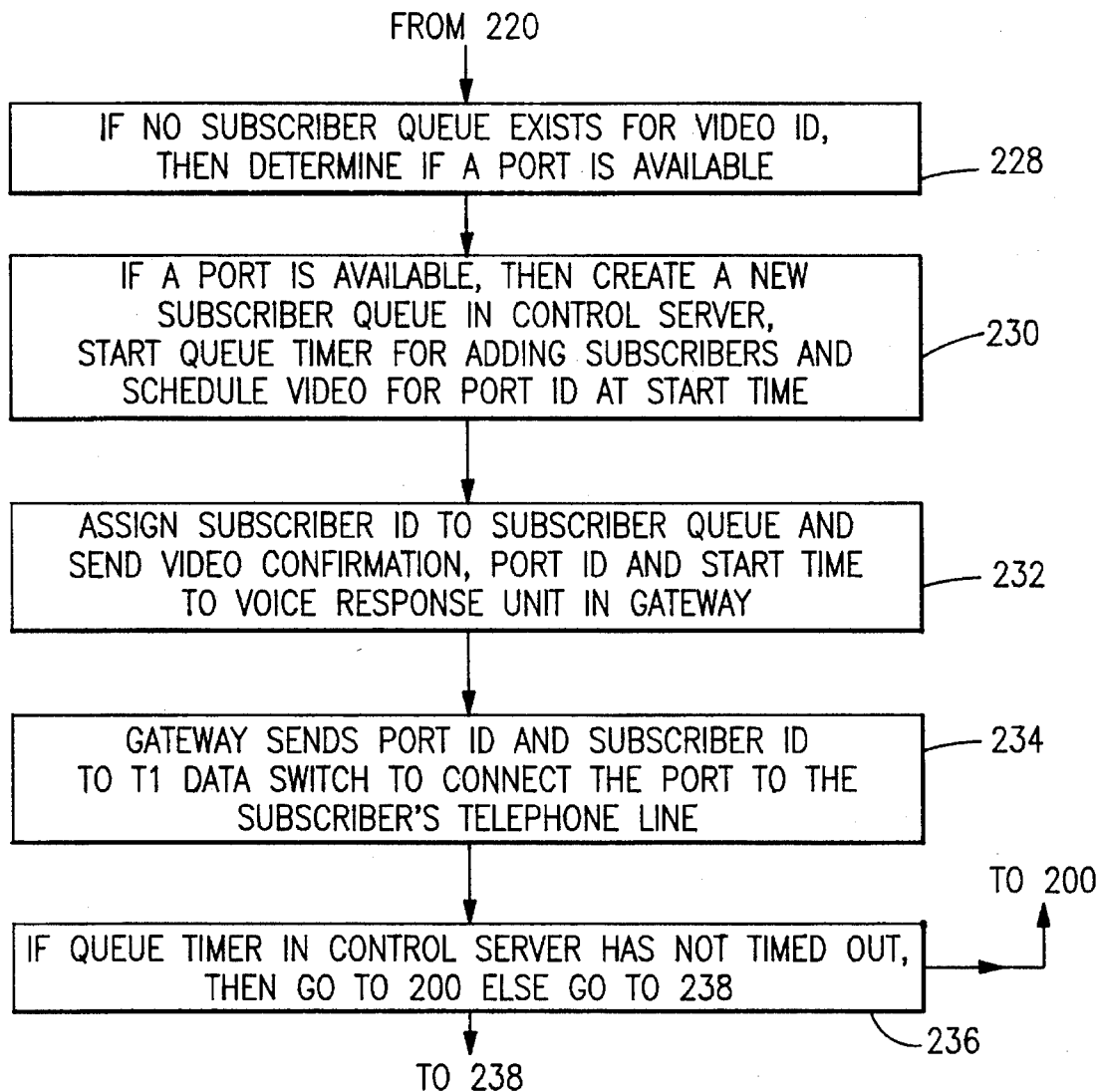
Figure 2C:
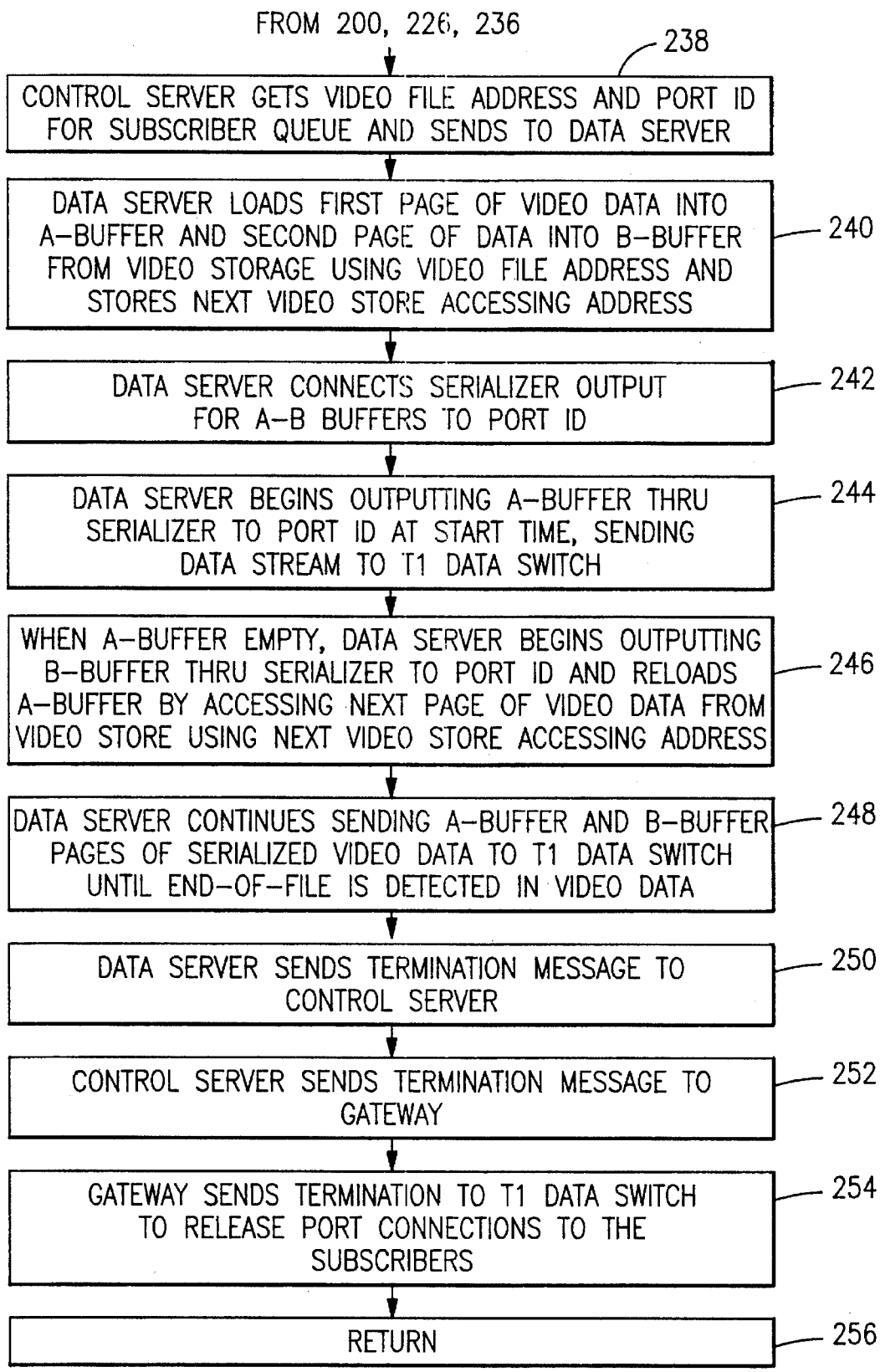

FIGS. 2A, 2B and 2C represent a flow diagram of a sequence of operational steps carried out by programs residing in the gateway 130, the control server 100 and the data server 160. These programs are each a sequence of executable instructions which, when executed on the associated Central Processing Unit (CPU), performs the desired functions and operations.

Figure 3:
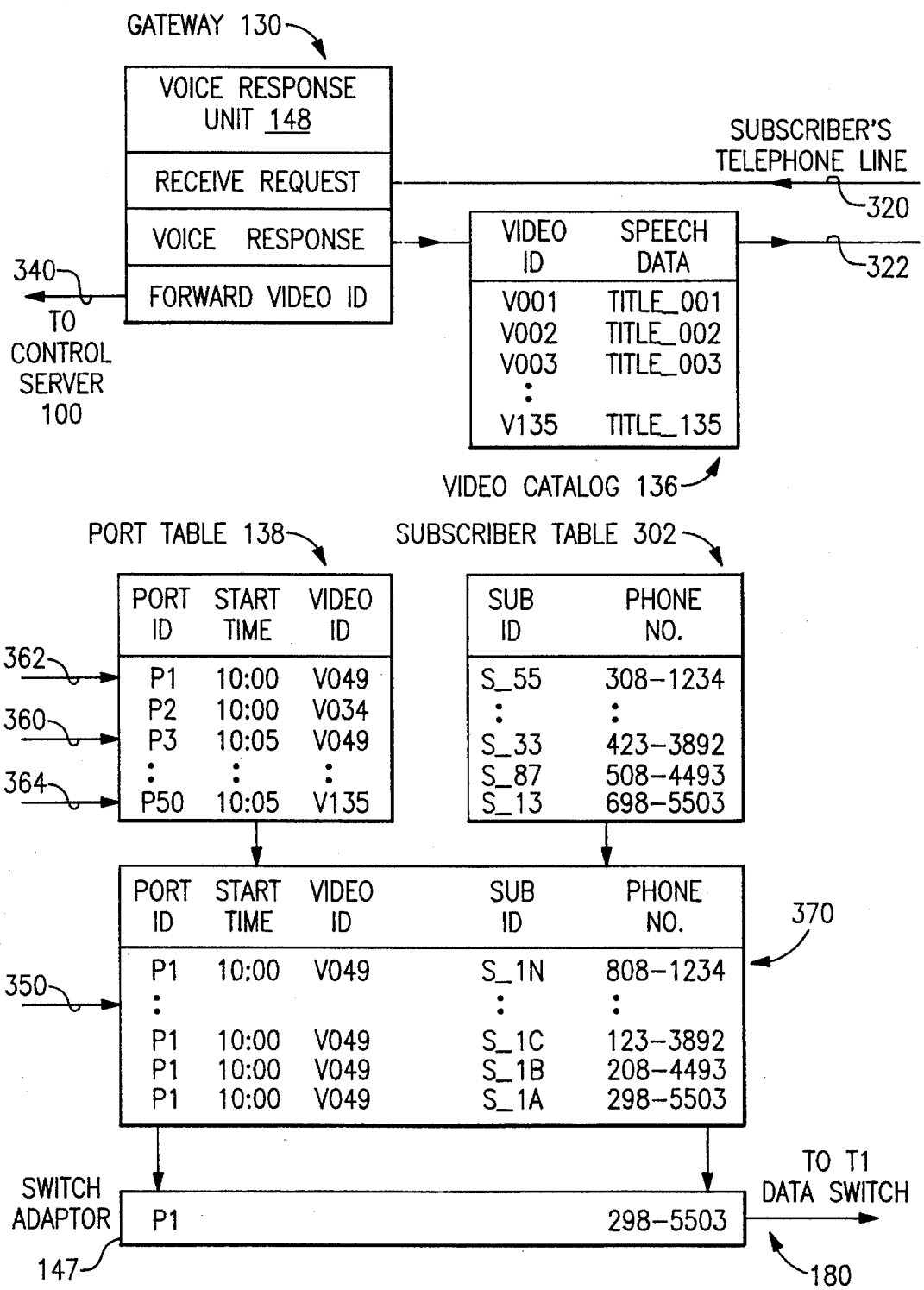
FIG. 3 is a more detailed functional block diagram of the gateway 130.
Figure 4:
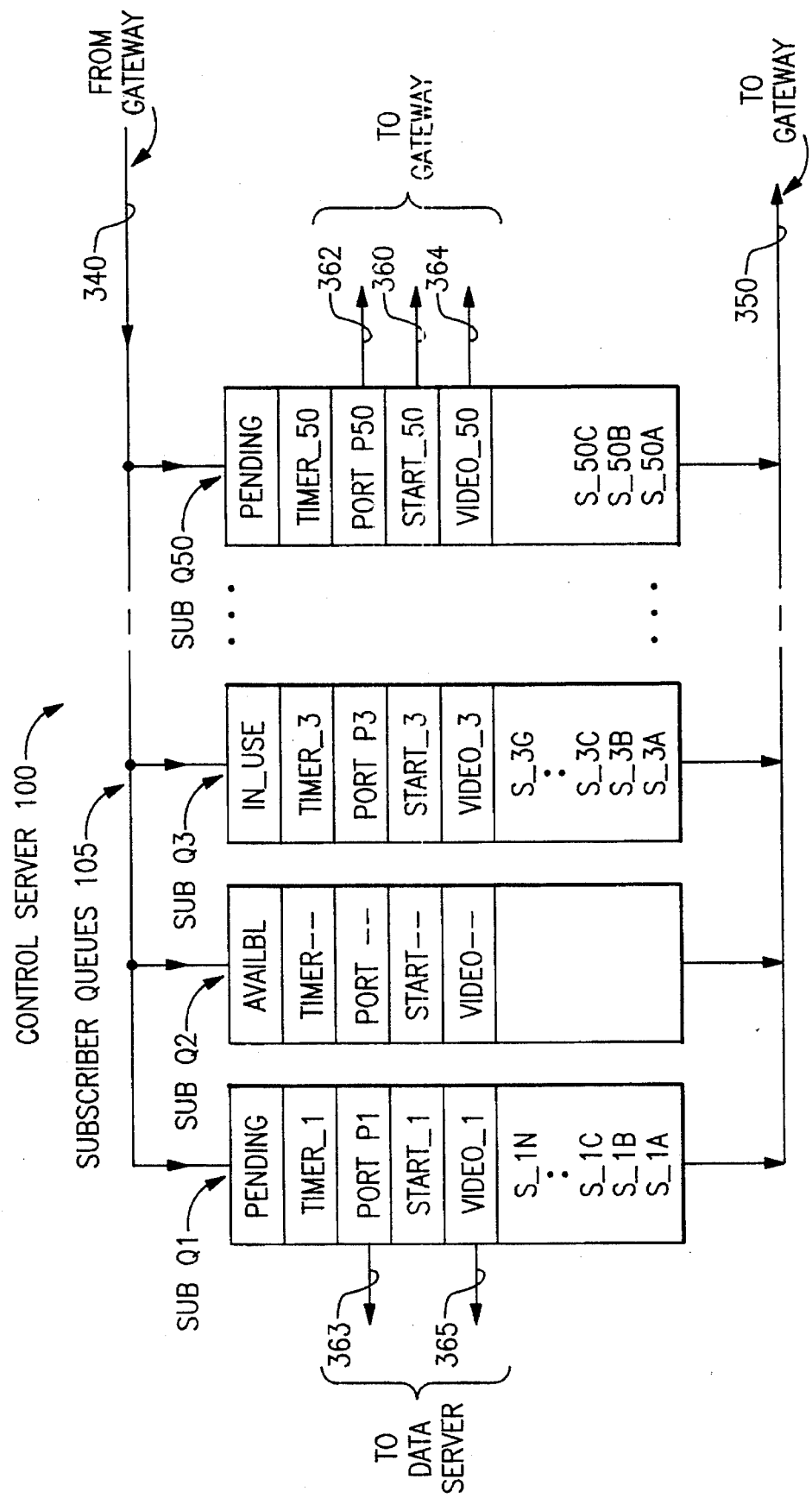
FIG. 4 is a more detailed functional block diagram of the control server 100.
Figure 5:
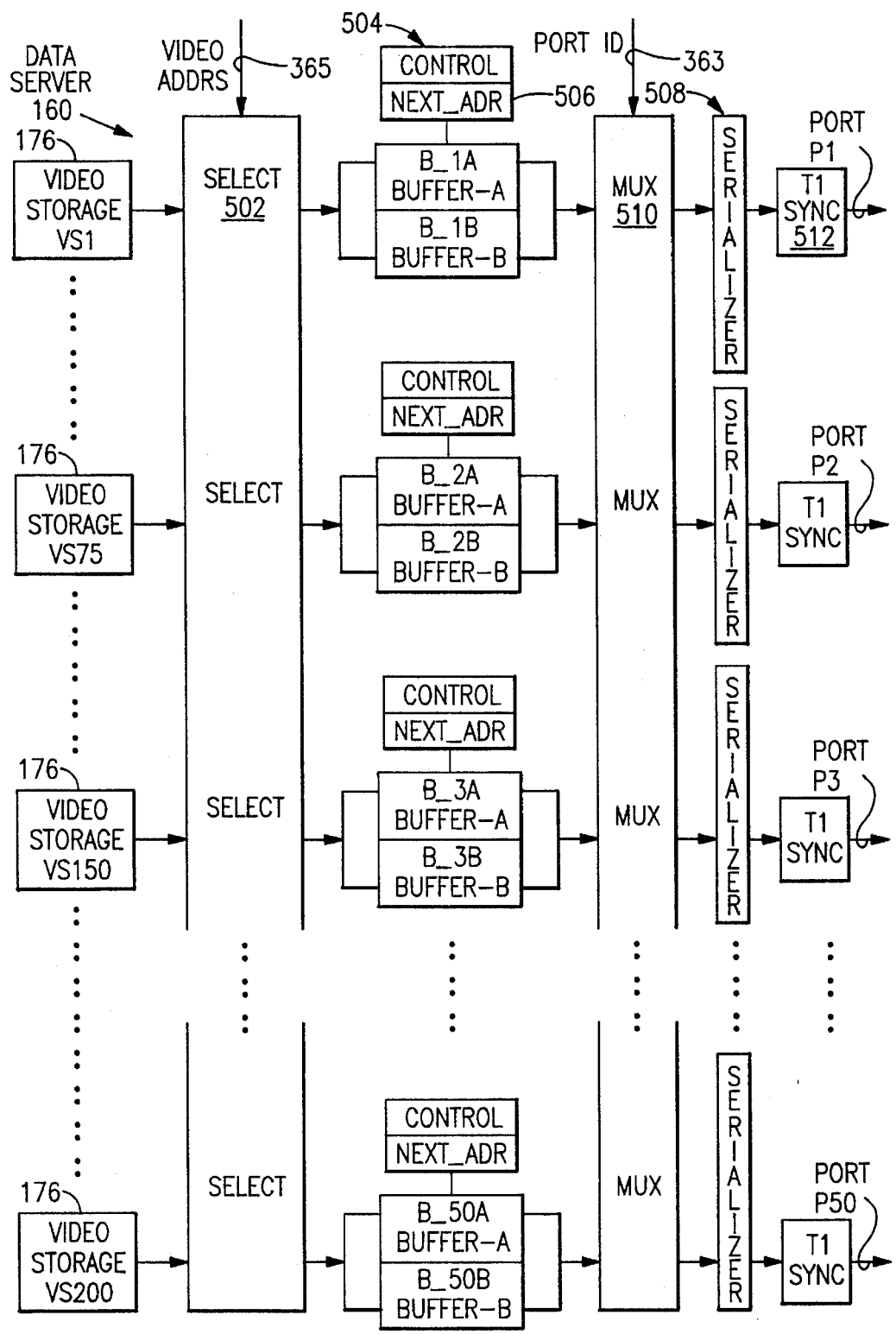
FIG. 5 is a more detailed functional block diagram of the data server 160.

FIG. 3 is a more detailed functional block diagram of the gateway 130. FIG. 4 is a more detailed functional block diagram of the control server 100. FIG. 5 is a more detailed functional block diagram of the data server 160.

FIG. 1 shows the gateway 130 including the memory 132 connected by means of the bus 142 to the adapter 143, the CPU 144, the keyboard and display 145, the storage 146, the switch adapter 147 and the voice response unit (VRU) 148. The CPU 144 executes the instructions in each program stored in the memory 132. Included in the memory 132 is a voice response unit control program 133, a subscriber validation program 134, a gateway video catalog management program 135, the gateway video catalog 136, a T1 data switch control program 137, a port table 138 and a billing program 140 to maintain the gateway billing records. Also included in the memory 132 is the operating system 141.

The gateway will receive a request from a subscriber in the telephone network, through the voice response unit 148. The gateway will respond with a voice response to the subscriber and will receive the subscriber's identification number which can be the subscriber's the telephone number, for example, and the identity of a requested video which the subscriber wishes to view. This is represented by a video ID. The gateway will validate the subscriber's ID with program 134 and then it will access the gateway video catalog 136 using the video ID, to determine whether the requested video is present in the system and the voice response unit will respond with a digitized voice response describing the video for confirmation to the subscriber. After confirmation of the subscriber's ID and the subscriber's requested video, signals are transferred over the X.25 adapter 143 from the gateway 130 to the control server 100. X.25 is a data communications protocol defined by the CCITT standard for interfacing between data terminal equipment (DTE) and package switching networks (PSN).

The control server 100 shown in FIG. 1 includes the memory 102 which is coupled by means of the bus 112 to the LAN adapter 113, the CPU 114, the keyboard and display 115, the storage 116, and the X.25 adapter 117. The memory 102 in the control server 100 includes the video scheduling and bundling program 104, subscriber queues 105, a server video catalog management program 106, the server video catalog 107, a remote command library to the data server 108, and the operating system 109. The programs contained in the memory 102 are sequences of executable instructions which are executed by the CPU 114 to carry out the desired operations or functions.

The X.25 adapter 117 receives the subscriber ID and the video ID from the gateway 130. The control server 100 will determine if a subscriber queue exists in the control server for this video ID and whether the subscriber queue is still accepting new subscribers. If it is, then the control server 100 will assign the subscriber ID to the corresponding subscriber queue and it will send video confirmation, the port ID and the starting time for the video presentation, to the gateway 130 over X.25 adapter 117.

The gateway can send a confirmatory message through the voice response unit 148 to the subscriber at this time, confirming the scheduling of the video presentation at the assigned starting time. Starting times are scheduled for sequential five minute times, for example. In a first embodiment of the invention, the port ID and the subscriber ID can be transmitted to the T1 data switch 180 through the switch adapter 147 for immediately constructing a network communications link to the subscriber. Alternately, the port ID and subscriber ID can be accumulated so that a group or all of the subscriber IDs corresponding to the port ID for a particular broadcast at the starting time, can be transferred in a single file to the T1 data switch 180.

The data server 160 in FIG. 1, includes the memory 162 which is coupled by means of the bus 172 to the LAN adapter 173, the CPU 174, the keyboard and display 175, the video storage 176 and the network adapter 178. The memory 162 in the data server 160, includes the video data flow control program 164, the data flow A-B buffers 165, a multimedia device control program 166, a video repository maintenance program 167 and the operating system 170. The programs in the memory 162 are sequences of executable instructions which are executable on the CPU 174 to carry out the functions and operations desired. The LAN adapter 173 is coupled to the LAN adapter 113 of the control server 100 over a suitable local area network such as an Ethernet network.

In the example embodiment described herein, there are 50 video data ports 179 output from the network adapter 178. The status of the 50 ports is maintained in the port table 138 of the gateway 130 and in the control server 100. A corresponding subscriber queue 105 is maintained for each of the 50 ports, in the control server 100. A corresponding pair of data flow A-B buffers 165 in the memory 162 of the data server 160, buffers the video data for one of the 50 assigned ports 179.

When a subscriber makes a request for a particular video ID, if no subscriber queue 105 exists at the time of the request, then the control server 100 will determine if a video data port 179 is available. If a port is available, then the control server 100 will create a new subscriber queue 105 in the control server, start a queue timer for adding more subscribers during a five minute interval, for example, and schedule the requested video for the available port ID, to begin at a start time which will be approximately at the end of that five minute period. These times are just an example and can be programmably changed by a system administrator. The control server 100 will then assign the subscriber ID to a subscriber queue and send video confirmation, the port ID and the start time to the gateway 130, as previously described. If the queue timer for the queue in the control server has not timed out, then the system waits for another subscriber request. If any of the subscriber queues 105 have timed out in the control server 100, the control server 100 begins the data server output and transfers the video file address corresponding to the video ID and the port ID to the data server 160.

The control server 100 transmits commands from the remote command library 108 to the data server 160 to access the video file corresponding to the video ID and to output it to the video data port 179 corresponding to the port ID. The data server 160 loads the first page of video data from the video storage 176 into an A-buffer and a second page of data into a B-buffer and it stores the next video store accessing address. The data server 160 connects the output for the A–B buffers to the port ID of the video data port 179. The data server 160 then begins outputting the A-buffer to the port ID at the start time, sending a data stream to the data switch 180. When the A-buffer is empty, the data server begins outputting the B-buffer through the serializer to the port ID of the video data port 179 and it reloads the A-buffer by accessing a next page of video data from the video storage 176 using the next video store accessing address. The data server continues sending the A-buffer and B-buffer pages of serialized video data to the data switch 180, until an end-of-file is detected in the video data. This operation of the A–B buffers assures that the serial data stream of video data will be continuous to the port.

Then, the data server 160 sends a termination message to the control server 180 over the LAN adapter 173. The control server 100, then sends a termination message over the X.25 adapter 117 to the gateway 130. The gateway 130 then sends a termination message over the switch adapter 147 to the T1 data switch 180, to release the port connections to the subscribers who are receiving the broadcast.

In this manner, the resulting data processing system provides digital video information on subscriber demand for very large video data files. The system enables rapid response to requests by network subscribers, independent of the number of subscribers or the number of video files offered for selection.

The flow diagrams of FIGS. 2A, 2B and 2C illustrate a sequence of operational steps carried out by the video server system shown in FIG. 1. The steps begin at step 200 which determines if any queue timer in the control server 100 has timed out and if it has, then the program goes to step 238, otherwise it goes to step 202. Then, step 202 receives the request in the gateway 130 from a subscriber. Step 204 responds with a voice response unit 148 in the gateway. Step 206 receives the subscriber ID and the video ID at the gateway. Then step 208 validates the subscriber ID in the gateway. Then step 210 accesses the gateway video catalog 136 using the video ID to provide voice response data describing the video, to the subscriber in the network. In step 212, the voice response unit responds with the data to the subscriber.

Then in step 214, the gateway sends the subscriber ID and the video ID to the control server 100. In step 216, the control server 100 checks the control server video catalog 107 for the video ID and gets the file address. Then in step 218, it determines if a subscriber queue 105 exists in the control server for this video ID and whether that subscriber queue is accepting new subscribers. In step 220, if no such queue exists, then the program flows to step 228. Otherwise it flows to step 222. In step 222, a subscriber ID is assigned to the subscriber queue and video confirmation, port ID and start time are sent to the in the gateway. In step 224, the gateway sends the port ID and subscriber ID to the T1 data switch 180, to connect the port to the subscriber's telephone line. Alternately, the gateway can accumulate the subscriber IDs and corresponding port IDs to perform a block transfer for a particular port connection for all of the subscribers. The suitability of this alternate embodiment depends upon the operating principles of the data switch 180. The in step 226, if the queue timer in the control server has not timed out, the program flow goes back to step 200. Otherwise, the program flow goes to step 238.

In FIG. 2B, the step 228 flows from step 220, and determines if no subscriber queue exists for a video ID, then a determination is made whether a port is available. In step 230, if a port is available, then a new subscriber queue is created in the control server, the queue timer is started for the period during which additional subscribers may be added, and the video is scheduled for the port ID at the start time which, for example, is five minutes away and is the duration of the queue timer. Then in step 232, the subscriber ID is assigned to the subscriber queue and video confirmation, port ID and start time are sent to the gateway 130. In step 234, the gateway sends the port ID and subscriber ID to the T1 data switch 180, to connect the port to the subscriber's telephone line in the public switched telephone network, 190. Alternately, the gateway can accumulate some or all of the subscriber IDs corresponding to the particular port ID, until the approximate starting time for the video presentation, at which time, the block of port and subscriber ID information can be transmitted through the switch adapter 147 to the T1 data switch 180 to perform the network connections in the public switched telephone network 190. Then step 236 determines if the queue timer in the control server has not timed out, then the flow goes to step 200. Alternately, the flow will go to step 238.

FIG. 2C starts with step 238 which can be reached from either 200, step 226 or step 236. Step 238 has the control server getting the video file address which corresponds to the video ID and getting the port ID for the subscriber queue whose queue timer has timed out, and the control server 100 sends the video file address and the port ID along with a remote command to the data server 160. In step 240, the data server, in response to the remote command, loads a first page of video data into an A-buffer and a second page of data into a B-buffer from the video storage using the video file address and it stores the next video store accessing address. Reference to FIG. 5 will show the video storage VS1 which is coupled by means of the selector 502, in response to the video address received on line 365, to the A-buffer pair B1A, B1B. The multiplexer 510, in response to the port ID received on line 363, will connect the buffers B1A, B1B to the serializer 508 for the port P1. The serializer 508 is coupled through the T1 synchronization unit 512 to the port P1. Step 242 of FIG. 2C shows the data server 160 connecting the output for the A–B buffers to the serializer 508 for the port ID. Then in step 244 of FIG. 2C, the data server 160 begins outputting the A-buffer B1A through the MUX 510 and serializer 508 to the port ID P1 at the start time, sending a serial data stream to the T1 data switch 180. In step 246, when the A-bUffer is empty, the data server 160 begins outputting the B-buffer B1A through the serializer 508 to the port ID P1 and it reloads the A-buffer B1A by accessing the next page of video data from the video store 176, using the next video store accessing address in the next address register 506, shown in FIG. 5. Then step 248 of FIG. 2C, has the data server continuing sending A-buffer and B-buffer pages of continuous, serialized video data to the T1 data switch until an end-of-file is detected in the video data. Then in step 250, the data server sends a termination message to the control server 100.

The FIG. 2C shows step 252 in which control server 100 sends a termination message to the gateway 130. In response to this, step 254 has the gateway sending a termination message to the T1 data switch 180 to release the port connections to the subscribers in the public switched telephone network 190. Then step 256 of FIG. 2C returns to the main program.

FIG. 3 shows the more detailed functional block diagram of the gateway 130. The gateway 130 includes the voice response unit 148 which receives requests from the subscriber's telephone line 320 and provides a voice response output, using the digitized voice response stored in or associated with the video catalog 136. This is output on the return line 322 for the subscriber's telephone. Then, the gateway 130 will forward the video ID provided by the subscriber's telephone line 320, over the line 340 to the control server 100.

FIG. 4 shows the control server 100, which depicts the line 340 from the gateway, input to the subscriber queues 105. FIG. 4 shows that there can be as many as 50 subscriber queues Q1, Q2, Q3–Q50. There can be fewer or more queues maintained in the memory 102 of the control server 100, as desired. The expansion of additional queues will allow additional subscribers and additional ports to be accommodated.

As is shown in FIG. 4, the first queue Q1 is in a pending state which means that a first subscriber has been assigned to the queue corresponding to a particular video presentation VIDEO-1 at a particular start time and a particular port P1. The timer TIMER-1 for the queue is timing the duration of a period of availability of the queue Q1 for adding additional subscribers for this particular video which will start its broadcast a particular start time START-1. As can be seen in FIG. 4, another queue Q2, is in an available state, which means that it has no current assigned subscribers, port or video and its timer is not currently running. A third queue Q3 shown in FIG. 4 is depicted as being in use, which means that it is no longer available for the addition of additional subscribers who would like to see a particular video VIDEO-3 at a particular starting time START-3 to be broadcast over a particular port P3. The corresponding VIDEO-3 may either be about ready to begin broadcast or be currently broadcasting.

FIG. 4 indicates still a fourth queue Q50 which is also in a pending state with its timer TIMER-50 timing the remaining portion of the duration of availability for assignment of additional subscribers for that particular video VIDEO-50 at that particular starting time START-50 for port P50.

When a subscriber ID and a corresponding video ID are input on line 340 for a video such as VIDEO-1 which is currently associated with the queue Q1, which is in a pending state, the subscriber will simply be added to the subscriber queue Q1, as previously described. The port ID port P1, the starting time START-1 and the video identity VIDEO-1 will be transmitted on lines 362, 360 and 364, respectively to the gateway 130. This will be done in conjunction with the transmission back to the gateway on line 350 of the subscriber's ID. The gateway can either accumulate this information for a block transfer for network setup to the T1 data switch 180, or alternately the gateway 130 can output the port ID and the subscriber ID to the data switch as they are received from the control server 100, to establish the network connection to the requesting subscriber.

If a subscriber ID and video ID are input on line 340 from the gateway in FIG. 4 and there is no pending subscriber queue corresponding to that video ID, then a determination is made as to whether there is an available subscriber queue. In the example shown in FIG. 4, the subscriber queue Q2 is available, and therefore if a corresponding port is available, such as for example the port P2, the port ID P2 will be reserved for the subscriber queue Q2, the video ID for example, the VIDEO-2 will be associated with the subscriber queue Q2, and the starting time START-2 of for example five minutes later, will be stored or associated with the subscriber queue Q2. The queue TIMER-2 will be started for the five minute duration, for example, during which other subscribers requesting the same VIDEO-2, may be added to the subscriber queue Q2. The port ID, start time, and video ID can be transferred over lines 362, 360 and 364 respectively, to the gateway 130, and the subscriber ID can be transferred over line 350 to the gateway.

For a pending queue, such as Q1 in FIG. 4, when the timer TIMER-1 times out, the availability of that queue for further subscribers requesting the same video, is terminated. The port ID P1 is then transmitted over line 363 and the video ID VIDEO-1 is transmitted over the line 365, to the data server 160. Two or more queues may be assigned to the same video at different starting times and different ports.

Returning to FIG. 3 and the gateway 130, lines 362, 360 and 364 from the control server 100, can provide the port ID, start time and video ID information to the port table 138. This information can be accumulated, for example in the table 370 for the port P1, for a later block transfer through adapter switch 147 to the T1 data switch 180. Alternately, as each port ID P1 and subscriber ID is received in the gateway 130 from the control server 100, it can be output over the switch adapter 147 to the T1 data switch 180. This may require the use of the subscriber table 302 in the gateway 130, to translate the subscriber ID into the subscriber's telephone number so that a suitable telephone number and the corresponding port ID can be transferred in a message to the T1 data switch 180.

In FIG. 5, the data server 160 receives the video ID in the form of a video address on line 365, which configures the selector 502 to connect one of as many 200 video files VS1, VS75, VS150, VS200, etc., to any one of the 50 ports P1, P2, P3–P50, for example. The port ID is received on line 363 from the control server 100, and configures the multiplexer 510 to connect the corresponding port P1, P2, P3 to P50 to the corresponding buffer pair B1A, B1B or B2A, B2B or B3A, B3B or B50A, B50B. In this manner, great flexibility in the connectivity of particular video files in the video storage 176 to an assigned one of a plurality of ports P1–P50, can be accomplished by the data server 160.

The control 504 in the data server 160, will control the A-buffers associated with it, and will use the next address in the register 506, to sequentially select consecutive pages of video data from the video storage 176 for the serialization in the serializer 508 for transmission through T1 sync 512 to the corresponding assigned port.

Figure 6:
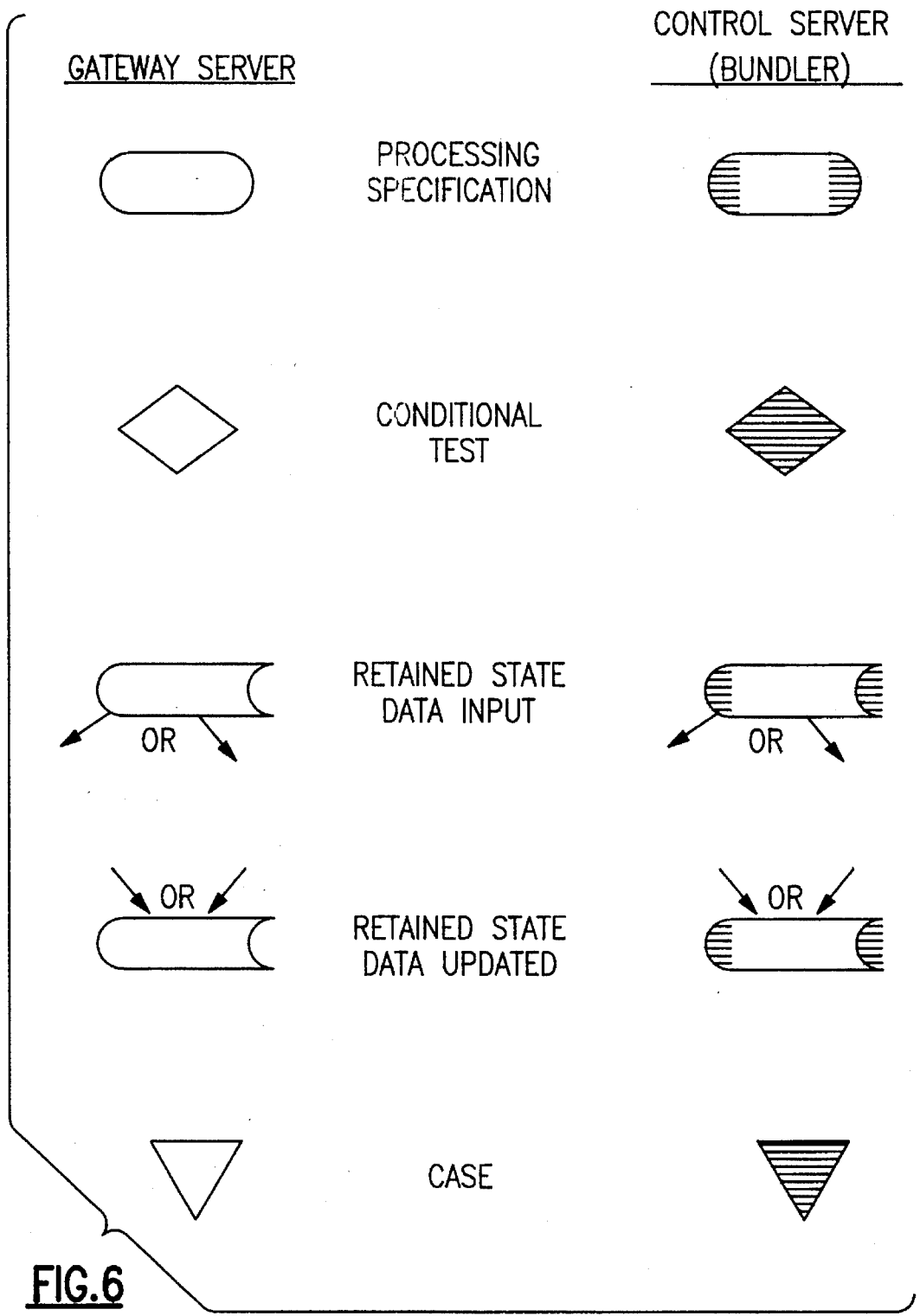
FIG. 6 depicts the flow diagram symbols for the flow diagrams of FIGS. 7–18B.

FIG. 6 shows the flow diagram symbols for the flow diagrams in FIGS. 7–18B, which are used to distinguish the gateway, the control server and the data server, whose functions the flow diagrams describe.

Figure 7:
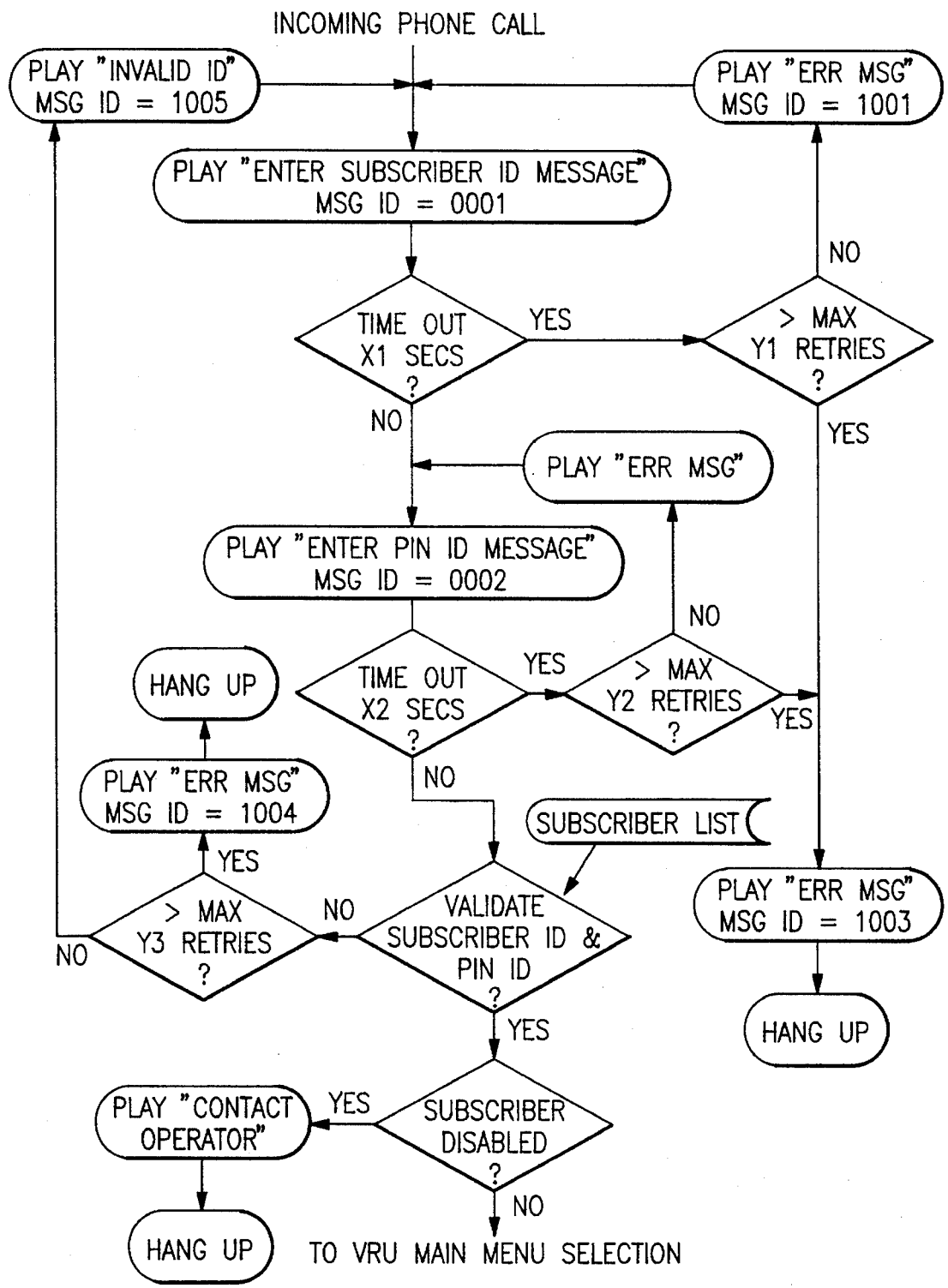
FIG. 7 is a flow diagram of the gateway voice response unit validate subscriber flow.

FIG. 7 shows the gateway VRU validate subscriber flow. This flow illustrates the validation process of a subscriber initially calling into the video on demand service offering via a voice response unit (VRU) 148. An incoming subscriber call is verified by prompting the subscriber through the necessary procedures for entering both subscriber ID and PIN number information. If both the subscriber ID and PIN number validates, the system will provide the subscriber with the VRU main menu selection options. If either the subscriber ID or PIN number entries are invalid, the system will respond with the appropriate response to the incoming VRU caller. The subscriber has both a limited amount of time and number of entries which provide the gateway server 130 with valid subscriber ID and PIN number information.

Figure 8:
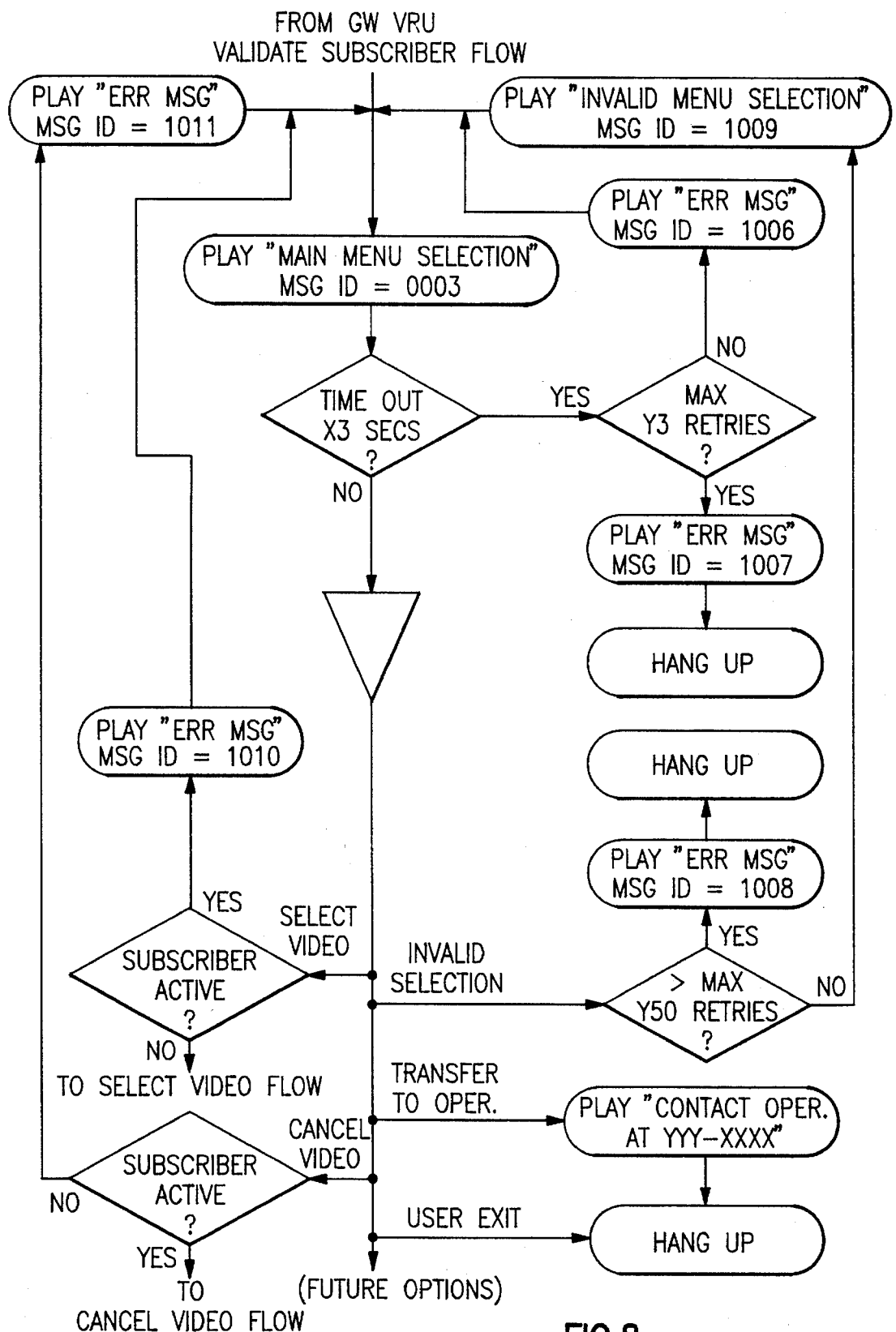
FIG. 8 is a flow diagram of the gateway voice response unit main menu selection flow.

FIG. 8 shows the gateway VRU main menu selection flow. This flow provides the set of options available to a valid subscriber when calling in through the VRU 148. In this flow, the subscriber is presented the menu list from which a selection can be made. The subscriber has both a limited amount of time and number of dual tone multifrequency (DTMF) entries at making a valid option selection. If an invalid selection is made, the system will notify the incoming caller of an invalid selection and provide the subscriber with the VRU main menu.

Figure 9A:
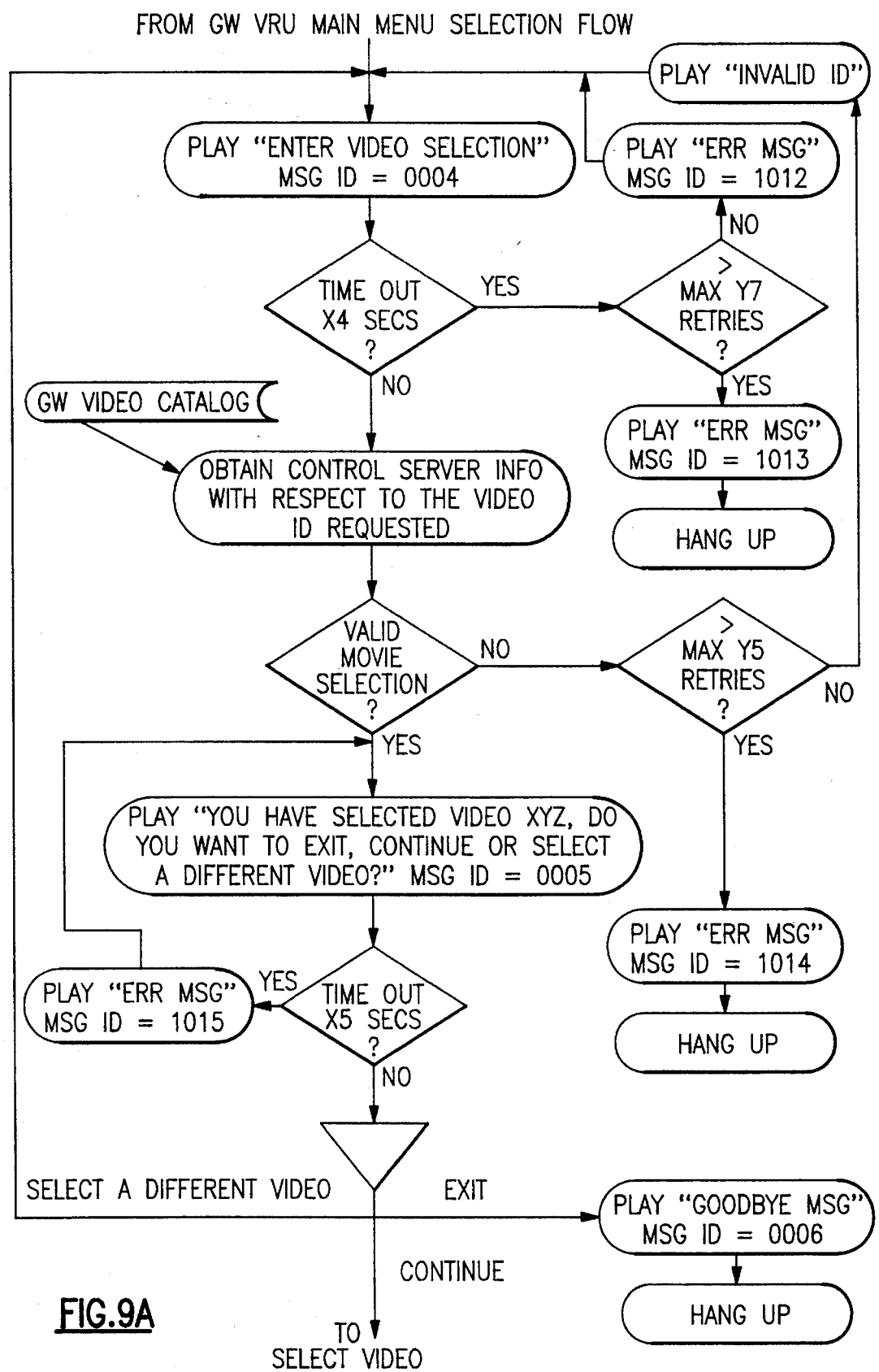
FIG. 9A and FIG. 9B are a flow diagram of the gateway voice response unit select video flow.
Figure 9B:
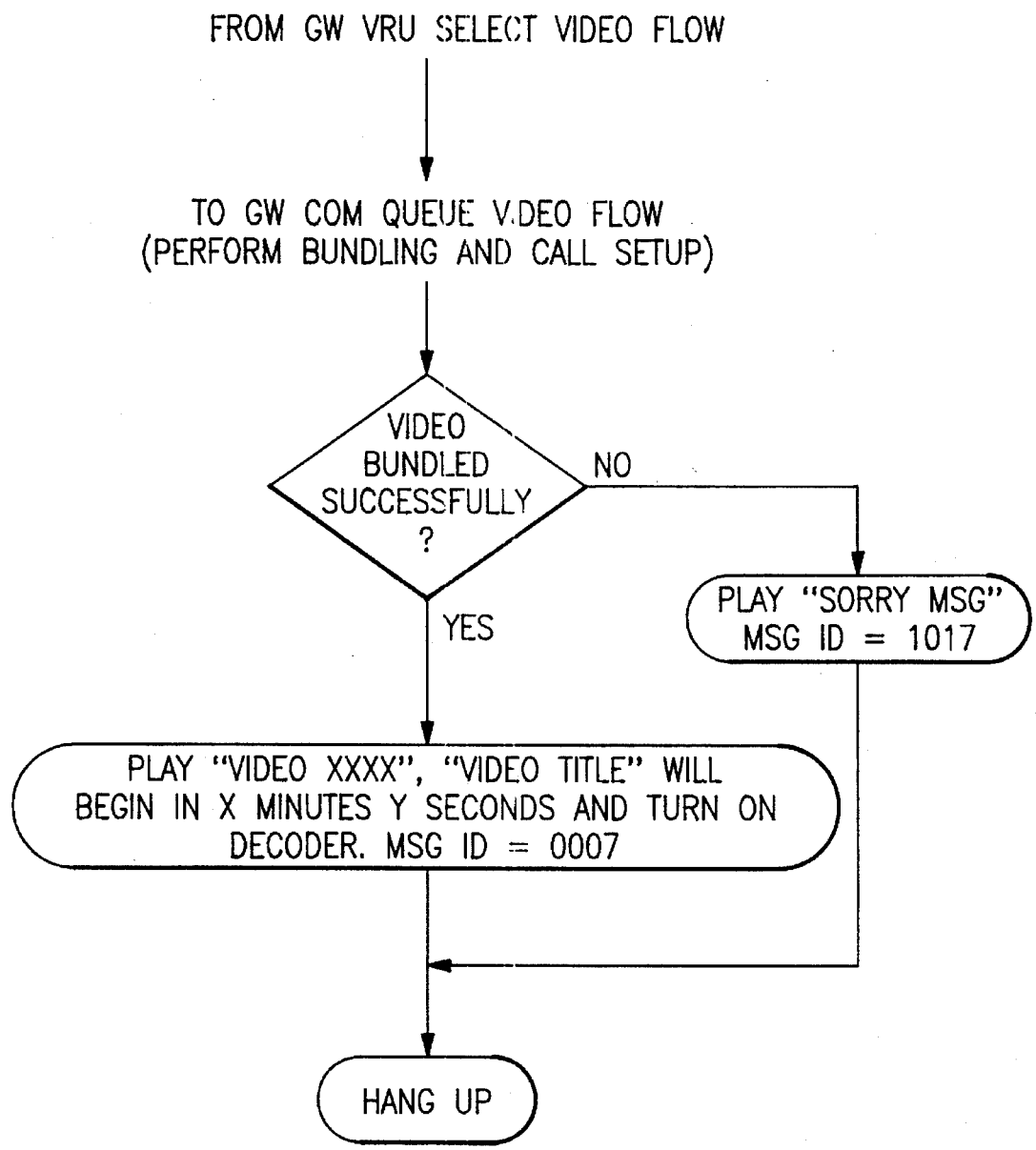

FIGS. 9A and 9B show the gateway VRU select video flow. This flow illustrates the process of subscriber selecting the VRU main menu selection of "Select Video" option. A subscriber is prompted through the necessary procedures for entering a subscriber desired video. The subscriber video selection is validated, played back to the subscriber with the video title, enters a video ID number. The control server and gateway acknowledge the request as valid or invalid. If the request for video is valid, the control server 100 is instructed to play the video for the subscriber. The data server 160 is called on, and other processes as subscriber billing 140 and updating subscriber records are initiated.

Figure 10:
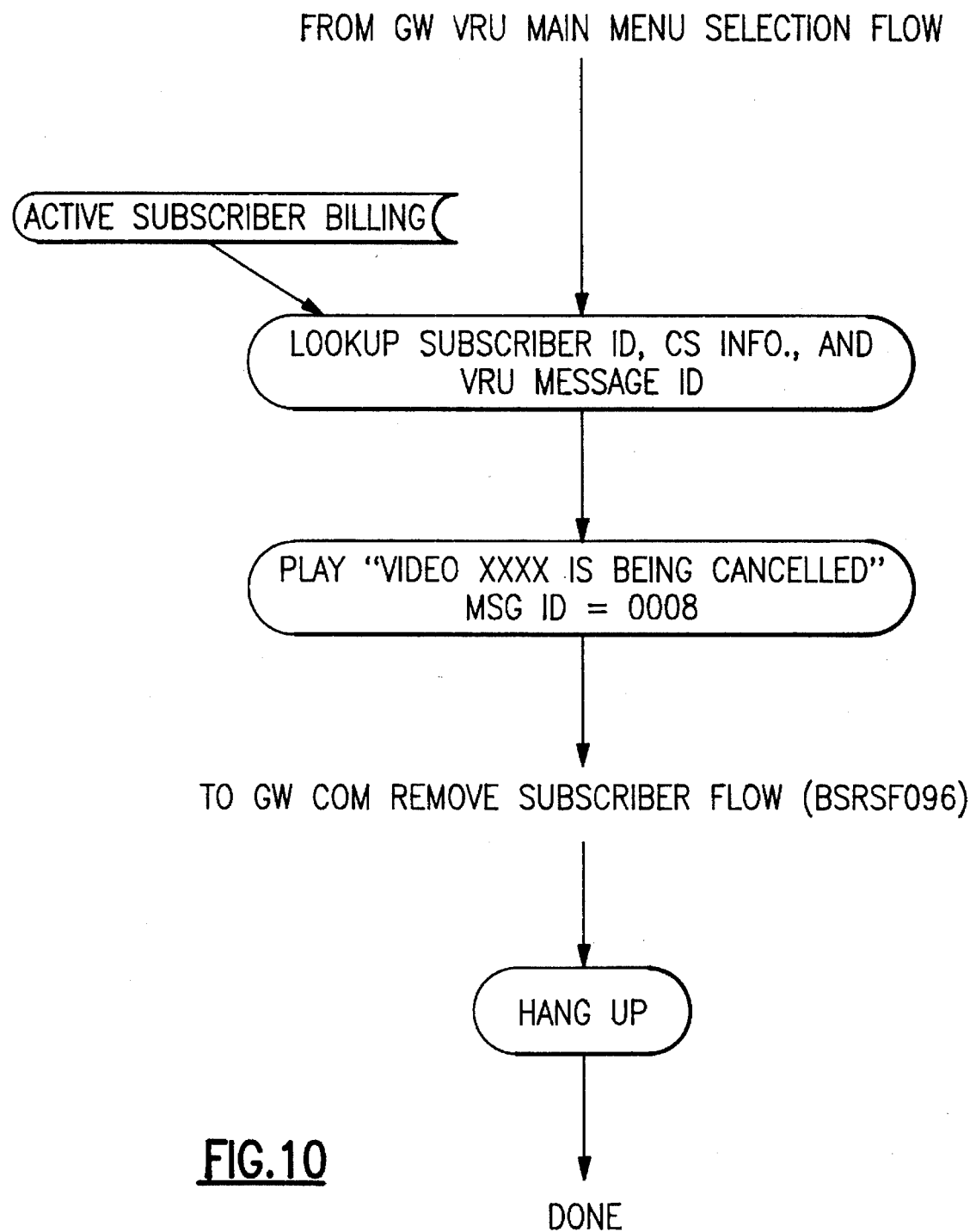
FIG. 10 is a flow diagram of the gateway voice response unit cancel video flow.

FIG. 10 shows the gateway VRU cancel video flow. This flow illustrates the process of a subscriber selecting the VRU main menu selection of "Cancel Video" option. A subscriber is prompted through the necessary procedures for canceling an active video request. If the request for video cancellation is confirmed, then the control server 100 is instructed to cancel the video for the subscriber. The billing records 140 are updated to indicate the cancellation of the video.

Figure 11A:
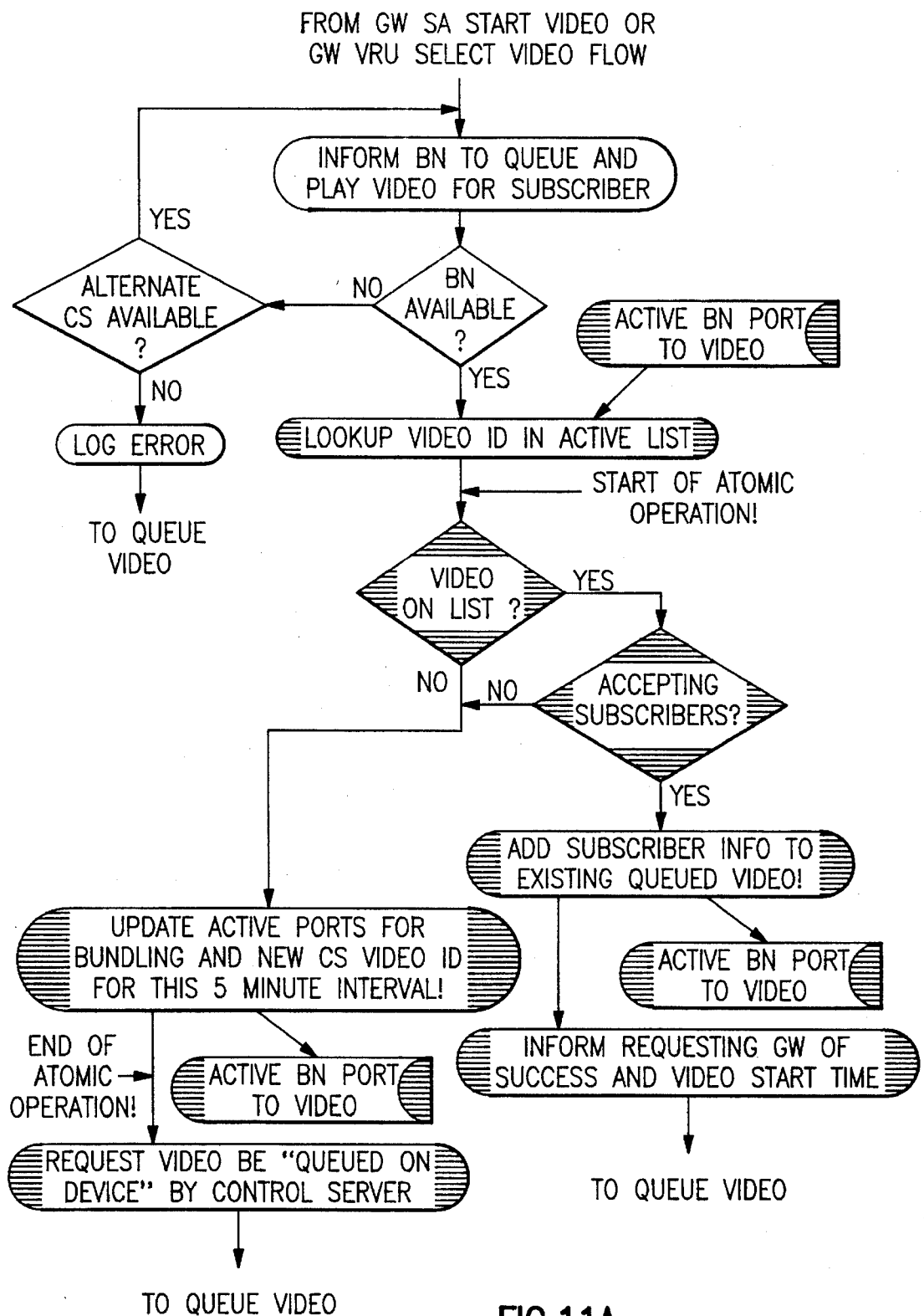
FIGS. 11A, 11B and 11C are a flow diagram of the gateway common queue video flow.
Figure 11B:
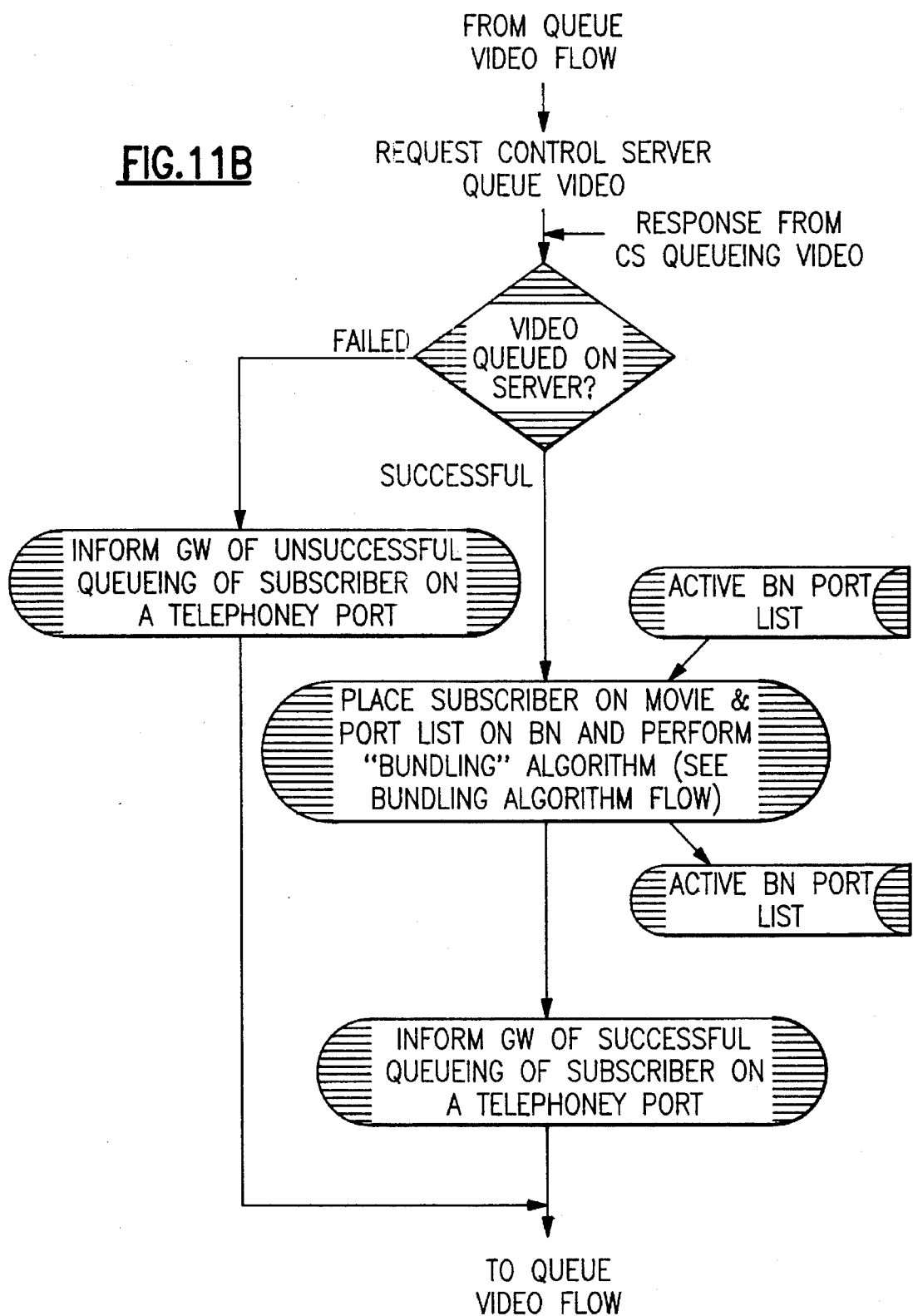
Figure 11C:
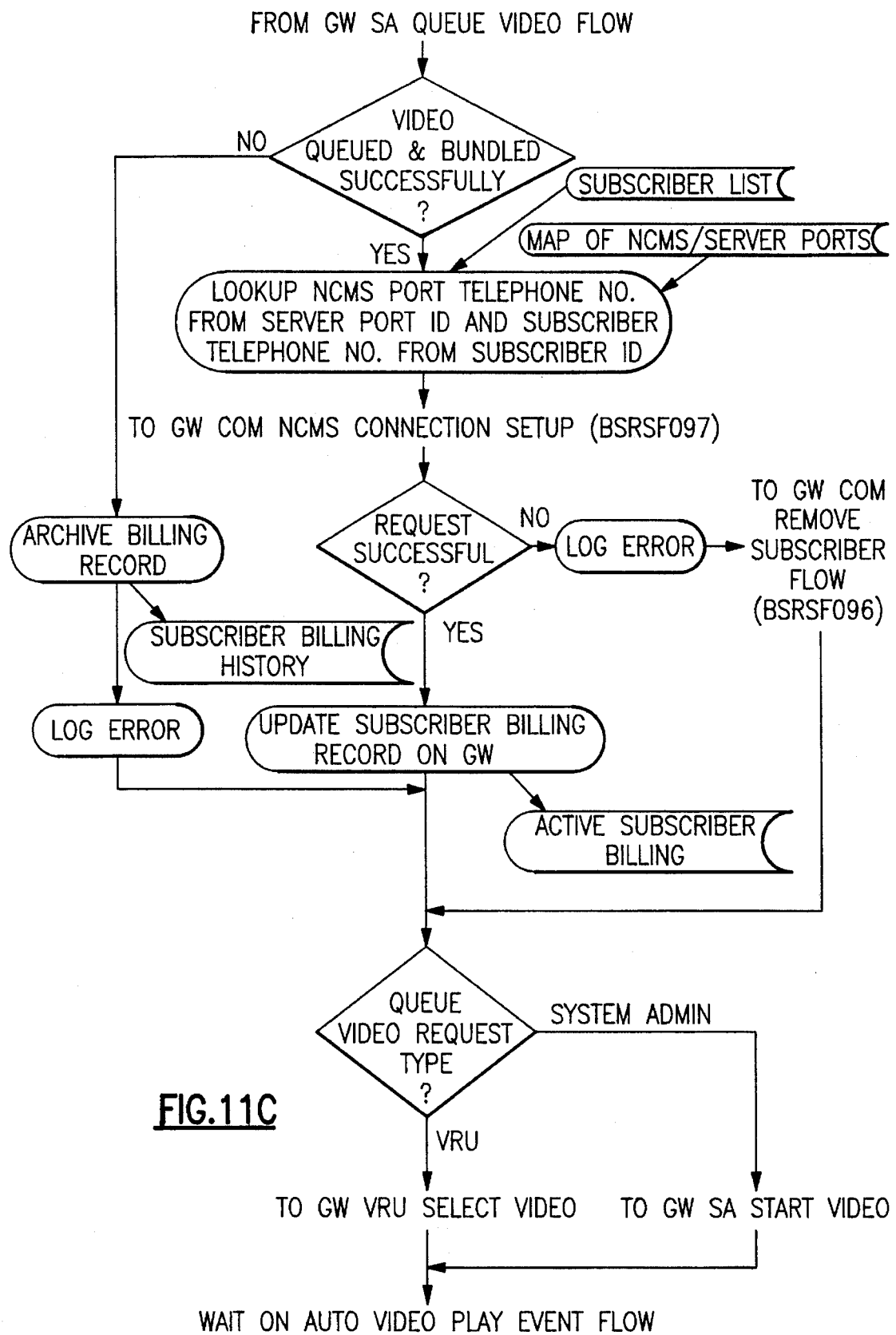

FIGS. 11A, 11B and 11C show the gateway common queue video. This flow illustrates a common process flow which may be utilized by one or more other flows. This flow provides the capability of adding one subscriber onto a queue in control server 100 for a specific gateway video. This flow includes the process of bundling the subscriber on a port and initiating the connection of the telephony network to the server port. All error cases are handled and responded to appropriately within this flow.

Figure 12A:
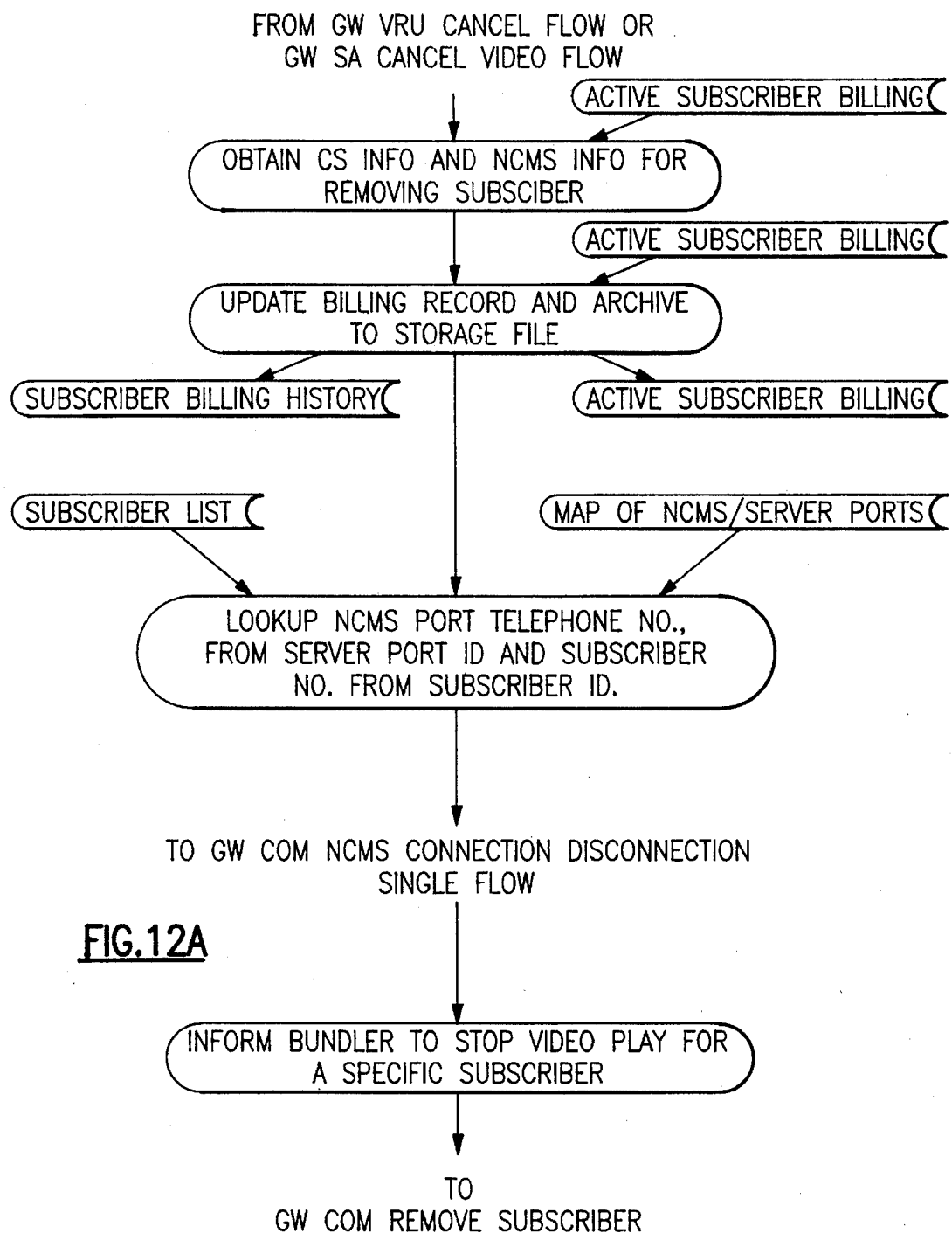
FIGS. 12A, 12B and 12C are a flow diagram of the gateway common remove subscriber flow.
Figure 12B:
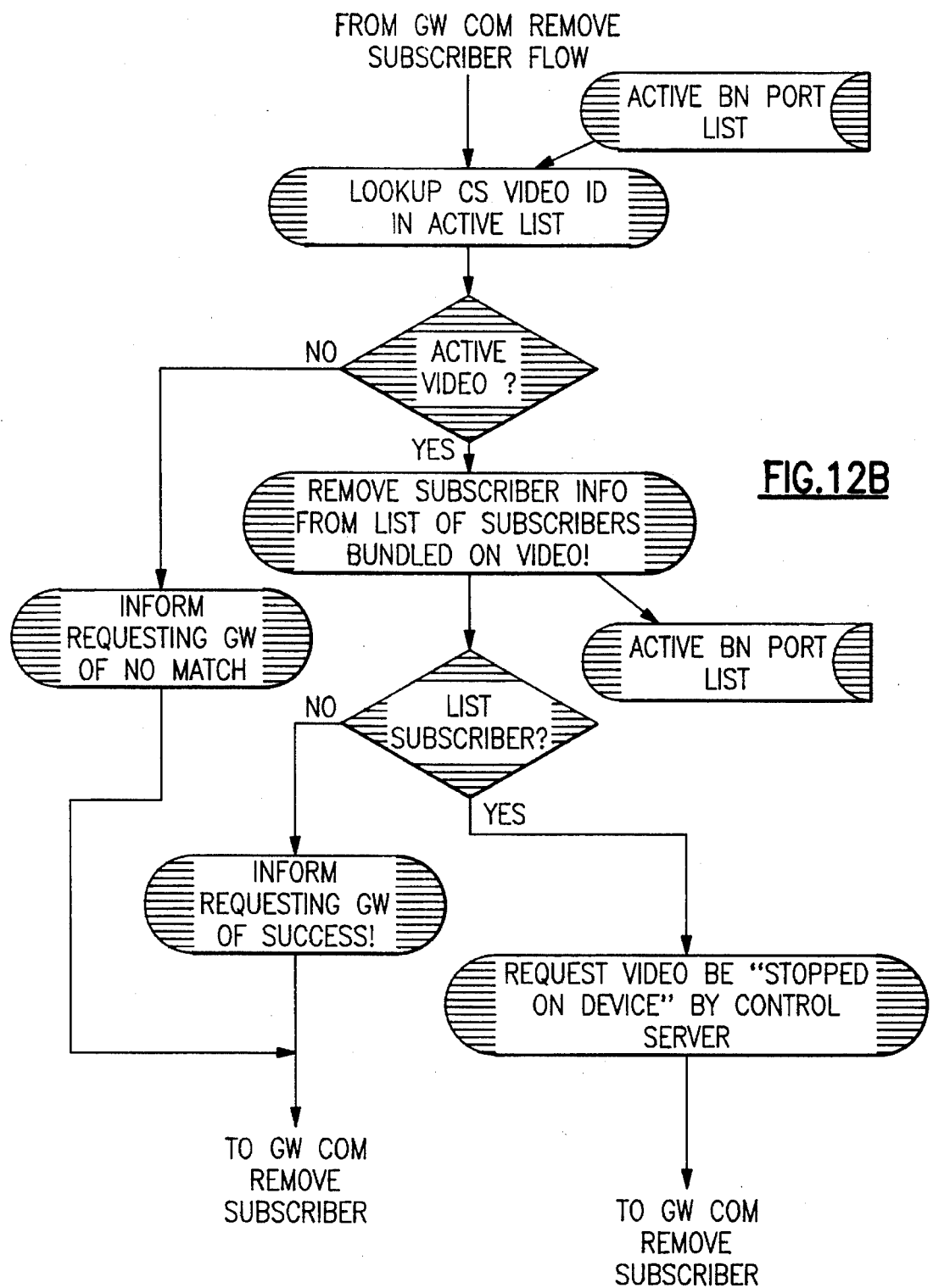
Figure 12C:
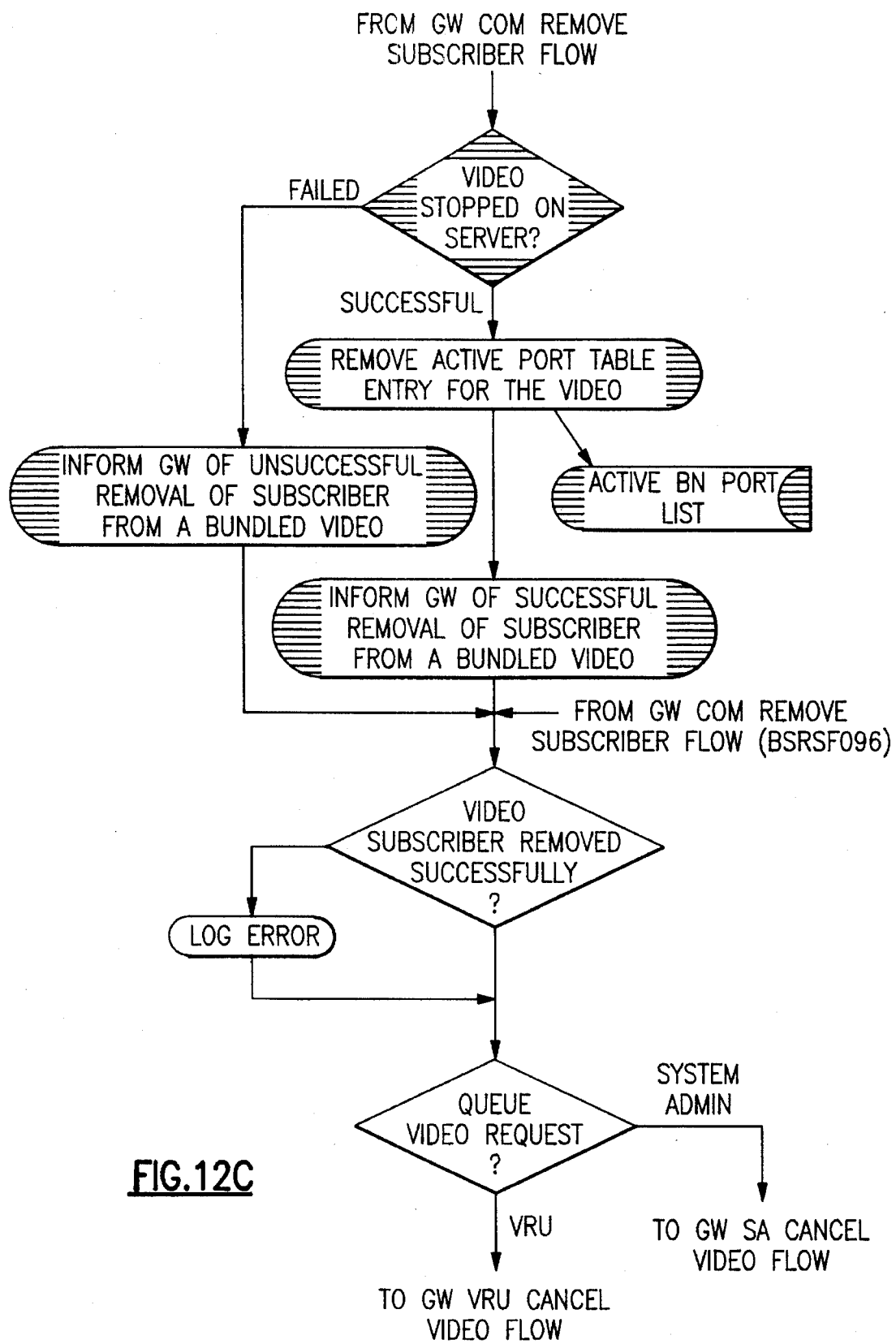

FIGS. 12A, 12B and 12C show the gateway common remove subscriber. This flow illustrates a common process flow which may be utilized by one or more other flows. This flow provides the capability of removing one subscriber from either a queued or currently playing video. This flow includes the process in control server 100 of unbundling the subscriber from a port, reallocating the port to the pool of available ports if this was the last subscriber on the port, and initiating the unconnecting of the telephony network to the port. All error cases are handled and responded to appropriately within this flow.

Figure 13:
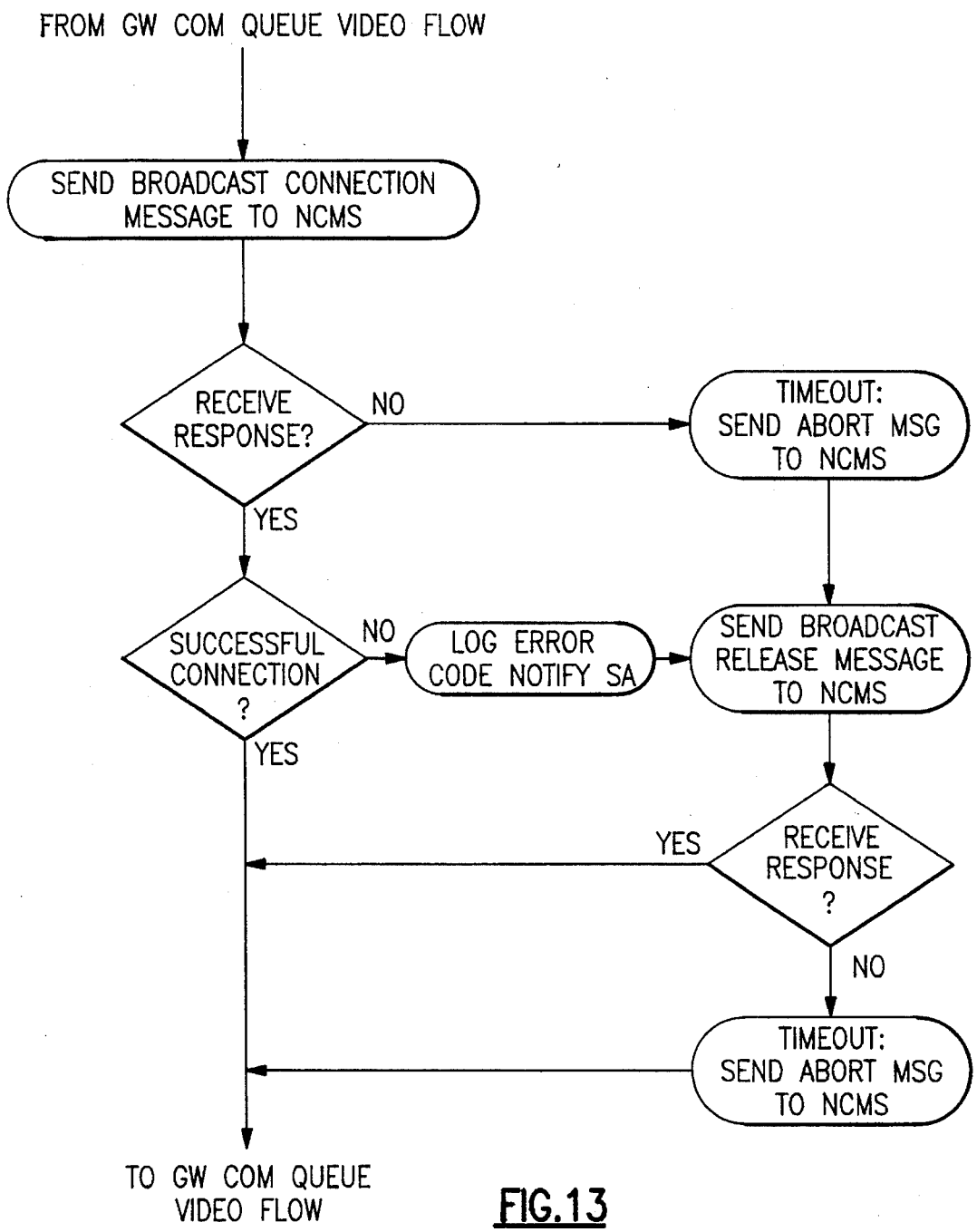
FIG. 13 is a flow diagram of the gateway common data switch (NCMS) connection set-up flow.

FIG. 13 shows the gateway common T1 data switch (NCMS) 180 connection setup. This flow illustrates a common process flow which may be utilized by one or more other flows. This flow provides the capability of initiating a connection with the NCMS subsystem 180. This includes the interface protocol required by NCMS in both the successful and unsuccessful connecting of the data server to the NCMS telephony network. All error cases are handled and responded to appropriately within this flow.

Figure 14:
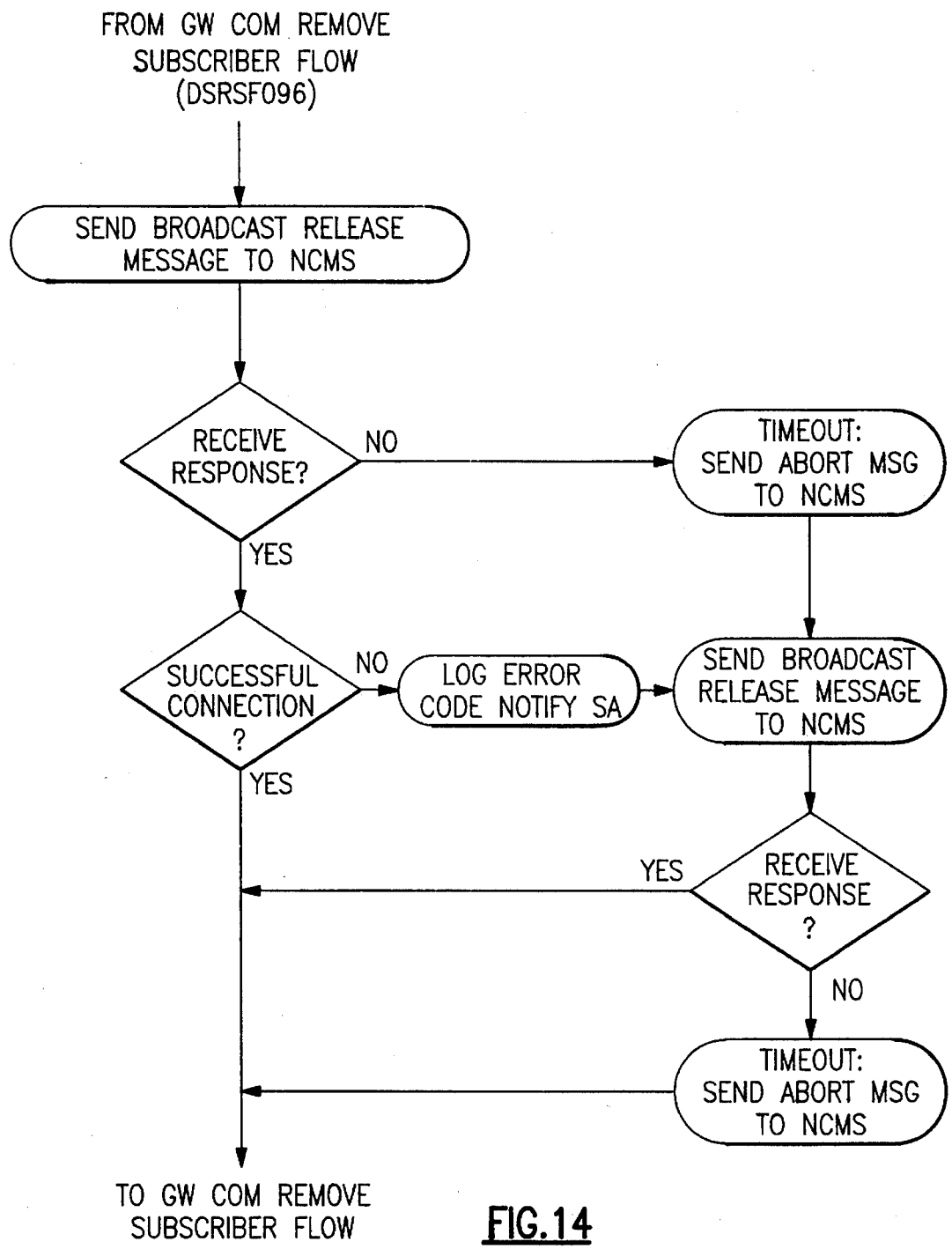
FIG. 14 is a flow diagram of the gateway common NCMS connection disconnect single flow.

FIG. 14 shows the gateway common NCMS connection disconnect single. This flow illustrates a common process flow which may be utilized by one or more other flows. This flow provides a capability of disconnecting a single subscriber within the NCMS subsystem 180 from its corresponding subscriber port. This includes the interface protocol required by NCMS in both the successful and unsuccessful disconnecting of a subscriber from the NCMS telephony network. All error cases are handled and responded to appropriately within this flow.

Figure 15:
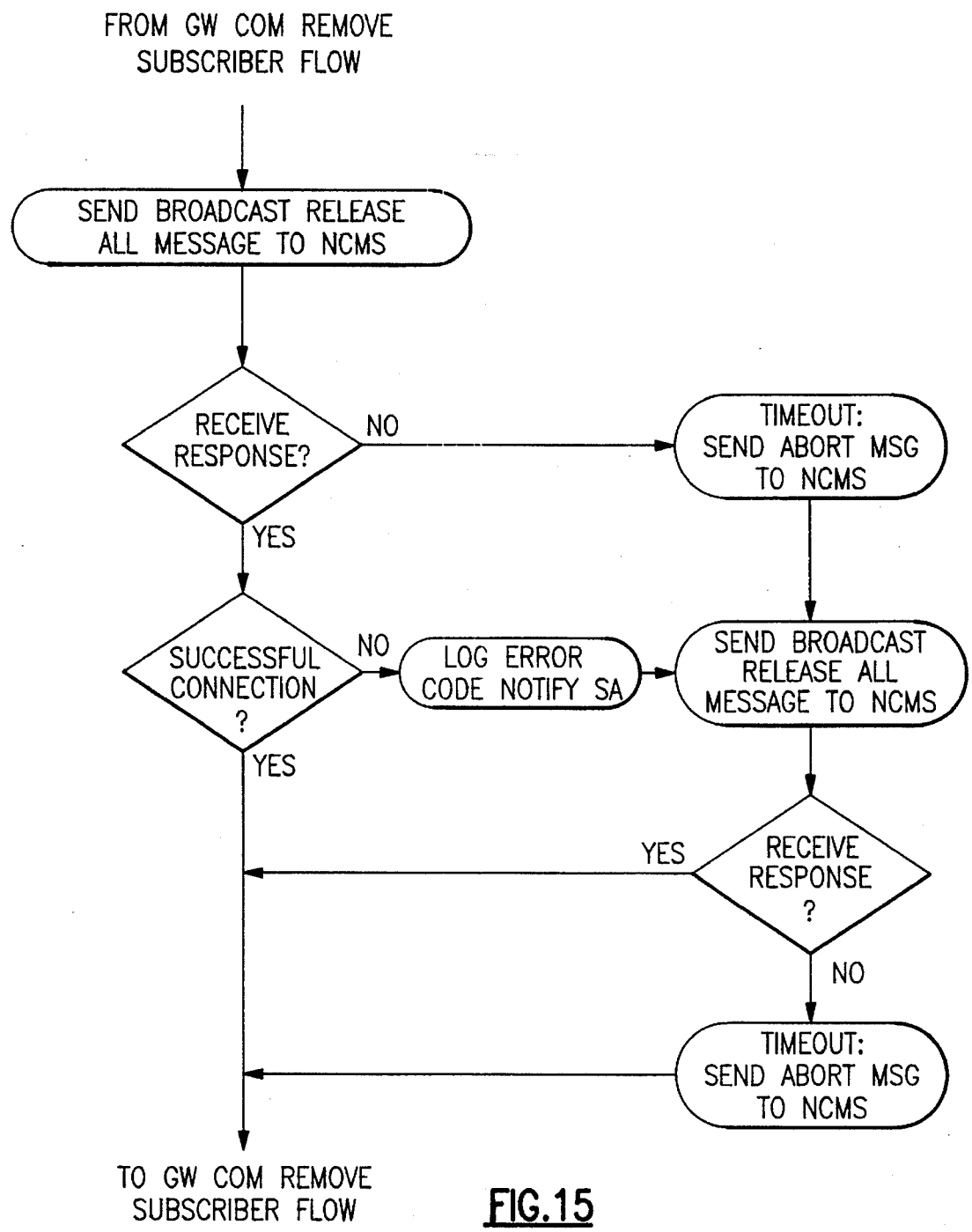
FIG. 15 is a flow diagram of the gateway common NCMS connection disconnect all flow.

FIG. 15 shows the gateway common NCMS connection disconnect all. This flow illustrates a common process flow which may be utilized by one or more other flows. This flow provides the capability of disconnecting all subscribers attached to a single server port from the NCMS subsystem 180. This includes the interface protocol required by NCMS in both the successful and unsuccessful disconnecting the of the data server from the NCMS telephony network. All error cases are handled and responded to appropriately within this flow.

Figure 16:
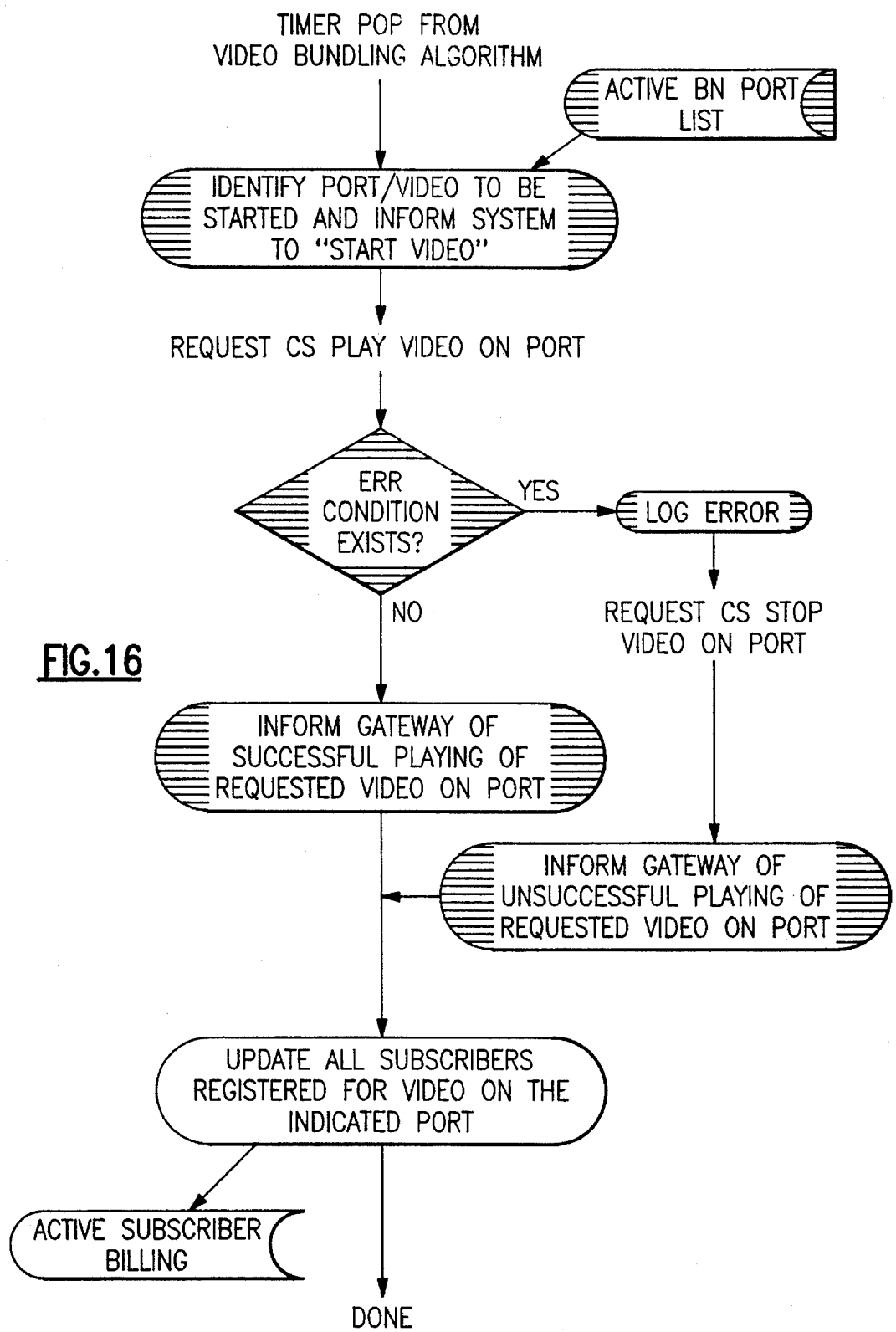
FIG. 16 is a flow diagram of the bundler (BN) system timer audio video play event control flow.

FIG. 16 shows the bundler (BN) time auto video play event control. This flow is initiated by the bundler process in control server 100 determining the appropriate time within its bundling algorithm to start the actual playing of the video on a telephony port. The queued video in data server 160 is taken from its current state and placed into an active playing state. The control server 100 is notified and validated for the playing of the video on a specific telephony port. Upon successful initiation of the video, the gateway server 130 is notified for billing purposes.

Figure 17:
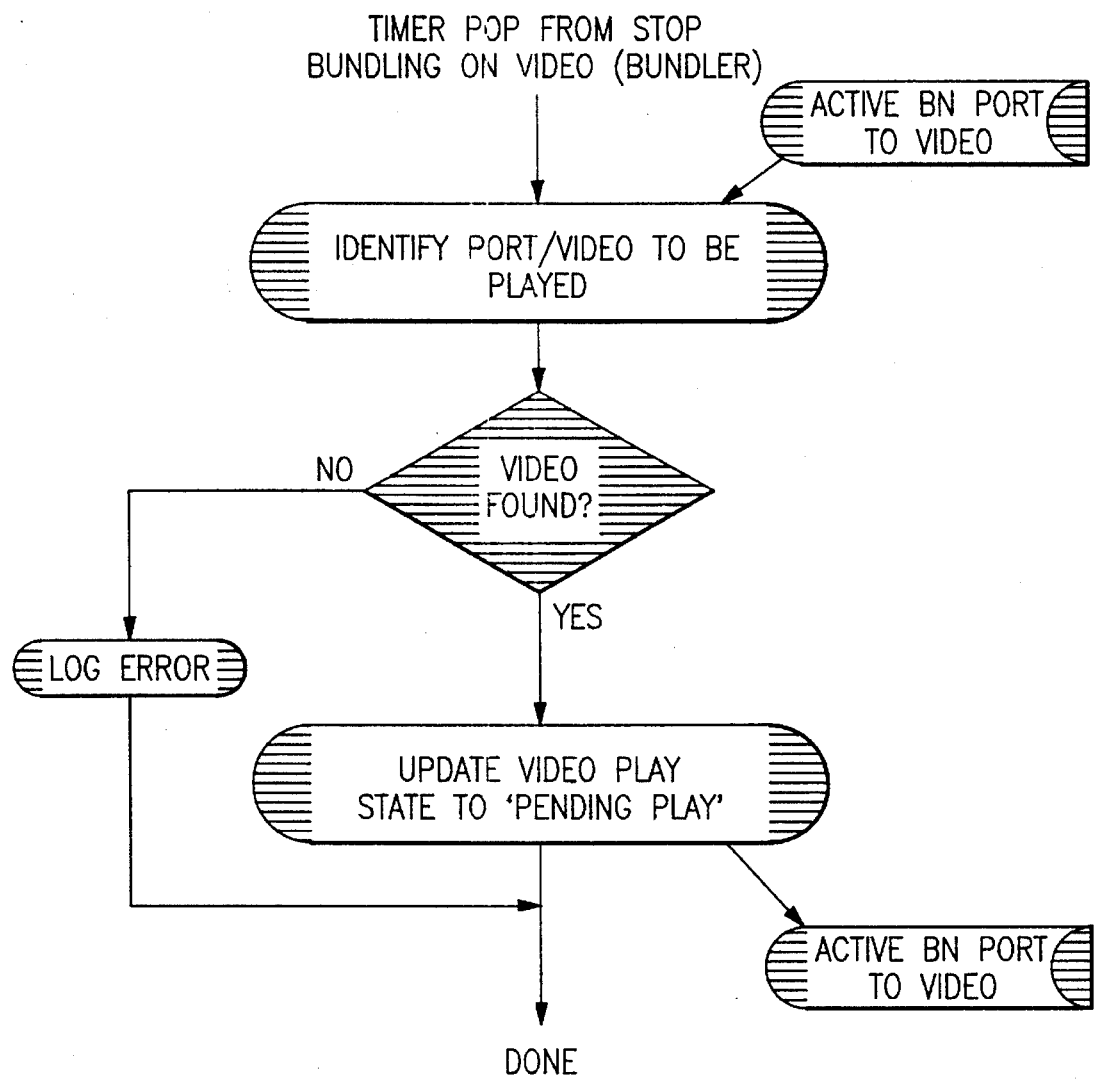
FIG. 17 is a flow diagram of the bundler (BN) system timer bundling complete event flow.

FIG. 17 shows the BN tim bundling complete event. This flow is initiated by the bundler process in control server 100 determining the appropriate time within its bundling algorithm to stop allowing subscribers to queue up on a specific server port which in another predetermined amount of time will begin playing the video as specified within the BN tim auto video play event flow.

Figure 18A:
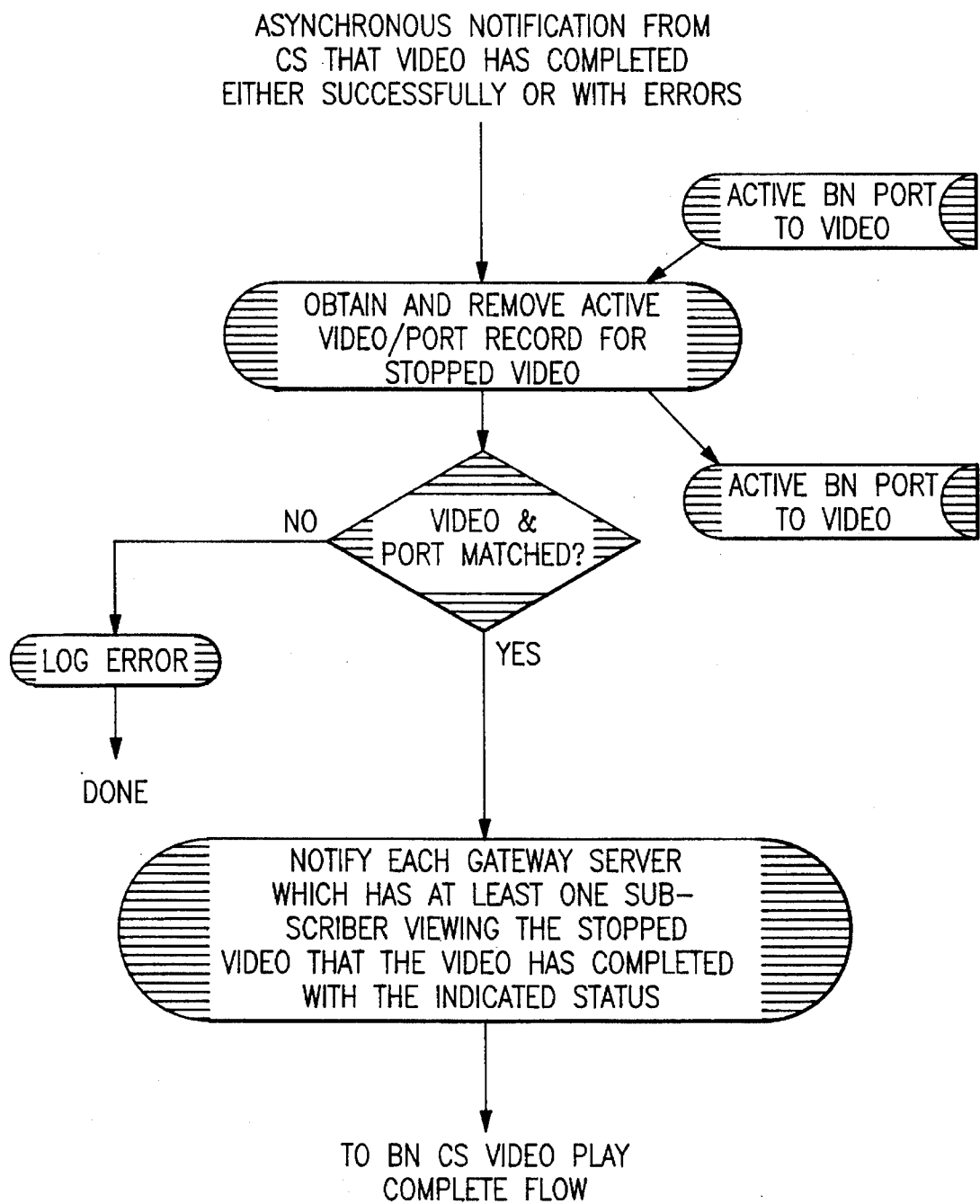
FIGS. 18A and 18B are a flow diagram of the bundler control server (BNCS) video play complete flow.
Figure 18B:
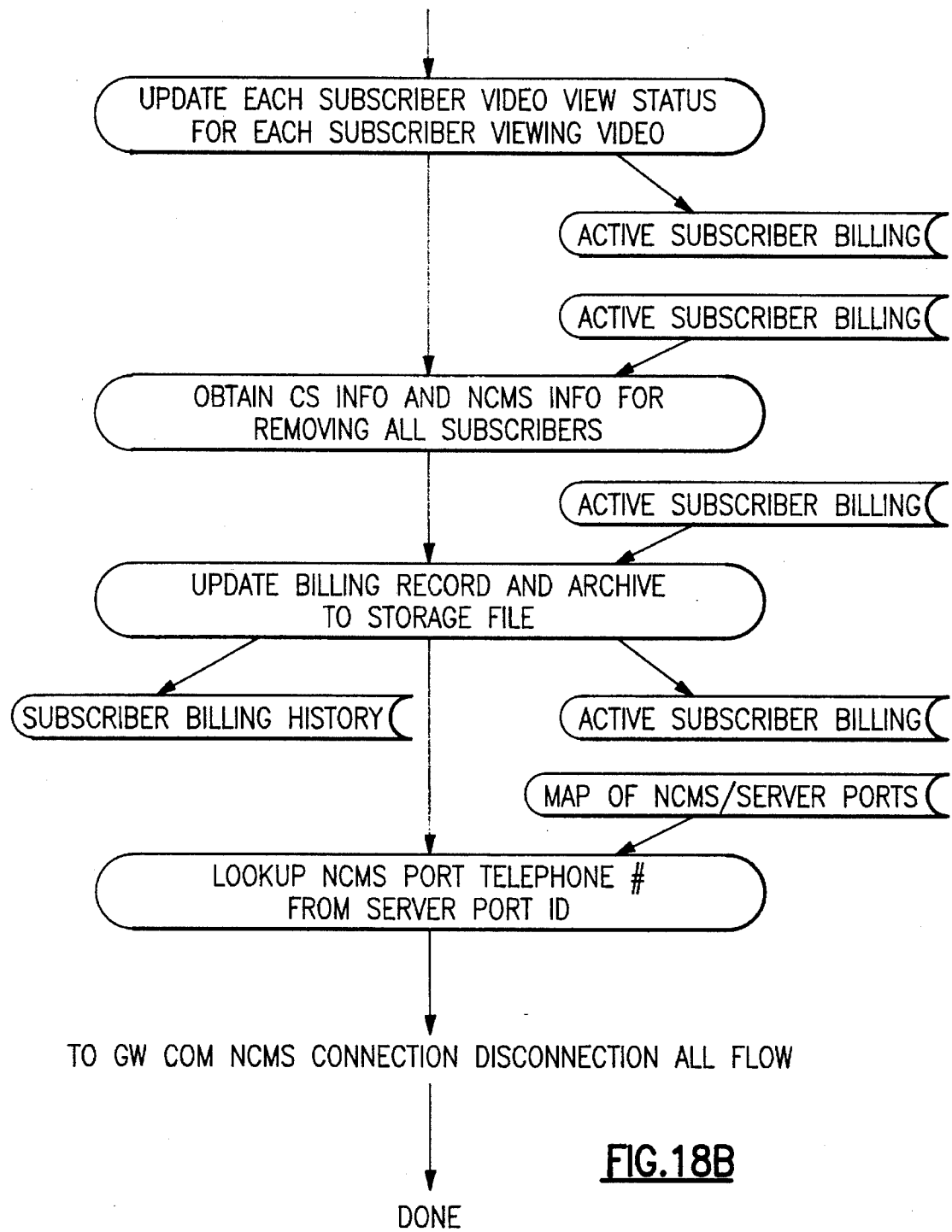

FIGS. 18A and 18B show the BN CS video play complete. This flow indicates the processing of the bundler receiving either a successful or unsuccessful completion status for a video queued or playing on a specified server port. In both cases, the port is relinquished for the playing of another video and the subscribers watching the video will be notified by gateway 130 of the successful or unsuccessful completion of the video on the port. Each gateway will update the subscriber billing records 140 and tear down the telephony network through switch 180, for each subscriber viewing the video.

The resulting video server system and method enable a video stored on the video storage as a single file, to be played at different start times, simultaneously. The video server invention is fully automated so that subscribers themselves can operate it via remote control from the subscriber network. The video server invention can be expanded to handle a large number of ports corresponding to unique video feeds and it can store a large number of video presentations in the video storage. The video server invention can accommodate itself to a variety of data switch interfaces enabling it to broadcast over a telephone network, a cable TV network, or local area networks, etc. The video server invention provides a highly reliable continuous service for the presentation of video on demand to a large number of subscribers.

Although a specific embodiment of the invention has been disclosed, it will be understood by those having skill in the art that changes can be made to that specific embodiment without departing from the spirit and the scope of the invention.

What is claimed is:

1. In a data processing system coupled to a subscriber communications network through a data switch, the system including a gateway coupled to the network, a control server coupled to the gateway and a data server coupled to the control server and to the data switch, a method for providing digital video data on subscriber demand, comprising the steps of:

receiving a subscriber demand in the gateway from the network, and forwarding a subscriber ID and a video ID for the digital video data to the control server;

determining that no subscriber queue exists in said control server corresponding to said video ID, which is accepting new subscribers;

creating a new subscriber queue in said control server if a new port having a new port ID is available, starting a new queue timer for adding subscribers to said new subscriber queue and scheduling said video ID for said new port ID at a new start time;

assigning said subscriber ID to said new subscriber queue;

sending said new port ID and said subscriber ID to the data switch to connect said new port to the subscriber;

sending said video ID and said new port ID to said data server after said new queue timer times out;

accessing a video storage in said data server using said video ID and loading a first page of said video data into an A-buffer and a second page of said video data into a B-buffer and storing a next video storage accessing address;

selectively coupling an output for said A-buffer and said B-buffer (A–B buffers) to said new port using said new port ID;

outputting said video data from said A-buffer to said new port to send said video data as a data stream to said data switch;

outputting said video data from said B-buffer to said new port when said A-buffer is empty and reloading said A-buffer by accessing a next page of video data from said video storage using said next video storage accessing address;

continuing said outputting of said video data from said A-buffer and said B-buffer to said data switch until an end of said video data is determined;

sending a termination message to said data switch to disconnect said new port from said subscriber.

2. The method of claim 1, wherein said step of receiving said demand in said gateway, further comprises the steps of:

responding with a first response to said subscriber using a voice response unit;

receiving said subscriber ID and video ID from said subscriber;

validating said subscriber ID;

accessing a gateway video catalog using said video ID, to obtain voice response data describing said video data;

responding with a second response to said subscriber using said voice response unit.

3. A data processing system coupled to a subscriber communications network through a data switch, for providing digital video data on subscriber demand, comprising:

a gateway coupled to the network, for receiving a demand from a subscriber, for said digital video data;

a control server coupled to said gateway, for receiving subscriber ID and video ID from said gateway and determining that no subscriber queue exists in said control server corresponding to said video ID, which is accepting new subscribers;

said control server creating a new subscriber queue in said control server if a new port having a new port ID is available, starting a new queue timer for adding subscribers to said new subscriber queue and scheduling said video ID for said new port ID at a new start time;

said control server assigning said subscriber ID to said new subscriber queue;

said control server sending said new port ID and said subscriber ID to the data switch to connect said new port to the subscriber;

a data server coupled to said control server and to the data switch, for receiving said video ID and said new port ID after said new queue timer times out;

said data server accessing a video storage in said data server using said video ID and loading a first page of video data into an A-buffer and second page of video data into a B-buffer and storing a next video storage accessing address;

said data server selectively coupling said A-buffer and said B-buffer to said new port using said new port ID and outputting said video data from said A-buffer to said new port to send said video data as a data stream to said data switch;

said data server outputting said B-buffer to said new port when said A-buffer is empty and reloading said A-buffer by accessing a next page of video data from said video storage using said next video storage accessing address;

said data server continuing said outputting of said video data from said A-buffer and said B-buffer to said data switch until an end of said video data is determined;

said data server sending a termination message to said data switch to disconnect said new port from said subscriber.

4. The system of claim 3, wherein said gateway, further comprises:

a voice response unit for responding with a first response to the subscriber;

said gateway receiving said subscriber ID and said video ID from the subscriber and validating said subscriber ID;

said gateway accessing a gateway video catalog using said video ID, to obtain voice response data describing said digital video data and responding a second response to the subscriber with said voice response data.

5. The system of claim 3, wherein said data server further comprises:

a video data selector coupled to a plurality of video data files in said video storage unit, for receiving said video ID and in response thereto, selecting one of said plurality of video data files for coupling to said A–B buffers;

a multiplexer coupled to a plurality of said ports, for receiving said port ID and in response thereto, selecting one of said plurality of ports for coupling to said A–B buffers;

whereby a selected one of said plurality of video data files can be output to selected any one of said plurality of ports.

6. In a data processing system coupled to a subscriber communications network through a data switch, the system including a gateway coupled to the network, a control server coupled to the gateway and a data server coupled to the control server and to the data switch, a method for providing digital video data on subscriber demand, comprising the steps of:

receiving a demand in the gateway from a subscriber, including a subscriber ID and a video ID for said digital video data;

sending said subscriber ID and video ID to the control server;

determining if a subscriber queue exists in said control server corresponding to said video ID having been previously assigned to a port having a port ID and determining whether said queue is accepting new subscribers;

assigning said subscriber ID to said subscriber queue and sending a video confirmation, said port ID and a start time to said gateway;

sending said port ID and subscriber ID to the data switch to connect said port to the subscriber;

continuing to receive additional subscriber demands until a queue timer in said control server times out;

sending said video ID and port ID to said data server after said queue timer times out;

accessing a video storage in said data server using said video ID and loading a first page of video data into an A-buffer and second page of video data into a B-buffer and storing a next video storage accessing address;

said data server selectively coupling said A-buffer and said B-buffer (A–B buffers) to said port using said port ID;

outputting said video data from said A-buffer to said port to send said video data as a data stream to said data switch;

outputting said video data from said B-buffer to said port when said A-buffer is empty and relocating said A-buffer by accessing a next page of video data from said video storage using said next video storage accessing address;

continuing said outputting of said video data from said A-buffer and said B-buffer as a data stream to said data switch until an end of said video data is detected;

sending a termination message from said data server through said control server and through said gateway to said data switch to release connections between said port and subscribers in said network.

7. The method of claim 6, wherein said step of receiving said demand in said gateway, further comprises the steps of:

responding to a first response with a voice response unit;

receiving said subscriber ID and video ID from the subscriber;

validating said subscriber ID;

accessing a gateway video catalog using said video ID, to obtain voice response data describing said digital video data;

responding to a second response with said voice response unit using said voice response data.

8. The method of claim 6, wherein said step of determining if a subscriber queue exists in said control server corresponding to said video ID, further comprises the steps of:

determining if a port is available if no subscriber queue exists for said video ID;

creating a new subscriber queue in control server if a new port having a new port ID is available, starting a new queue timer for adding subscribers to said new subscriber queue and scheduling said video ID for said new port ID at a new start time;

assigning said subscriber ID to said new subscriber queue and sending video confirmation, said new port ID and new start time to said voice response unit in said gateway;

sending said new port ID and subscriber ID to the data switch to connect said new port to the subscriber.

9. In a data processing system coupled to a subscriber communications network through a data switch, the system including a gateway coupled to the network, a control server coupled to the gateway and a data server coupled to the control server and to the data switch, a method for providing digital video data on subscriber demand, comprising the steps of:

receiving a demand in the gateway from a subscriber, including a subscriber ID and a video ID for said digital video data;

sending said subscriber ID and video ID to the control server;

determining if a subscriber queue exists in said control server corresponding to said video ID having been previously assigned to a port having a port ID and determining whether said queue is accepting new subscribers;

determining if a port is available if no subscriber queue exists for said video ID;

creating a new subscriber queue in said control server if a new port having a new port ID is available, starting a The method of claim 6, wherein said step of determining if a subscriber queue exists in said control server corresponding to said video ID, further comprises the steps of: determining if a port is available if no subscriber queue exists for said video ID; creating a new subscriber queue in control server if a new port having a new port ID is available, starting a new queue timer for adding subscribers to said new subscriber queue and scheduling said video ID for said new port ID at a new start time; assigning said ID to said new subscriber queue and sending video confirmation, said new port ID and new start time to said voice response unit in said gateway; sending said new port ID and subscriber ID to the data switch to connect said new port to the subscriber. In a data processing system coupled to a subscriber communications network through a data switch, the system including a gateway coupled to the network, a control server coupled to the gateway and a data server coupled to the control server and to the data switch, a method for providing digital video data on subscriber demand, comprising the steps of: receiving a demand in the gateway from a subscriber, including a subscriber ID and a video ID for said digital video data; sending said subscriber ID and video ID to the control server; determining if a subscriber queue exists in said control server corresponding to said video ID having been previously assigned to a port having a port ID and determining whether said queue is accepting new subscribers; determining if a port is available if no subscriber queue exists for said video ID; creating a new subscriber queue in said control server if a new port having a new port ID is available, starting a new queue timer for adding subscribers to said new subscriber queue and scheduling said video ID for said new port ID at a new start time;

assigning said subscriber ID to said new subscriber queue and sending a video confirmation, said port ID and a start time to said gateway;

sending said new port ID and subscriber ID to the data switch to connect said port to the subscriber.

10. The method of claim 9, which further comprises the steps of:

continuing to receive additional subscriber demands until said new queue timer in said control server times out;

sending said video ID and new port ID to said data server after said new queue timer times out;

accessing a video storage in said data server using said video ID and loading a first page of video data into an A-buffer and second page of video data into a B-buffer and storing a next video storage accessing address;

said data server selectively coupling an output for said A-buffer and said B-buffer (A–B buffers) to said port using said port ID;

outputting said A-buffer to said new port to send said video data as a data stream to said data switch;

outputting said B-buffer to said port when said A-buffer is empty and reloading said A-buffer by accessing a next page of video data from said video storage using said next video storage accessing address;

continuing said outputting of said video data from said A-buffer and said B-buffer as a data stream to said data switch until and end of said video data is detected;

sending a termination message from said data server through said control server and through said gateway to said data switch to release connections between said new port and subscribers in said network.

11. The method of claim 9, wherein said step of receiving said demand in said gateway, further comprises the steps of:

responding to a first response with a voice response unit;

receiving said subscriber ID and vide ID from the subscriber;

validating said subscriber ID;

accessing a gateway video catalog using said video ID, to obtain voice response data describing said digital video data;

responding to a second response with said voice response unit using said voice response data.

12. A data processing system coupled to a subscriber communications network through a data switch, for providing digital video data on subscriber demand, comprising:

a gateway coupled to the network, for receiving a demand from a subscriber, including a subscriber ID and a video ID for said digital video data;

a control server coupled to said gateway, for receiving subscriber ID and video ID from said gateway and determining if a subscriber queue exists in said control server corresponding to said video ID is having been previously assigned to a port having a port ID and determining whether said queue is accepting new subscribers;

said control server determining if a port is available if no subscriber queue exists for said video ID and creating a new subscriber queue in said control server if a new port having a new port ID is available, starting a new queue timer for adding subscribers to said new subscriber queue and scheduling said video ID for said new port ID at a new start time;

said control server assigning said subscriber ID to said new subscriber queue and sending video confirmation, said new port ID and new start time to said gateway;

said control server sending said new port ID and subscriber ID to the data switch to connect said new port to the subscriber.

13. The system of claim 12, which further comprises:

a data server coupled to said control server and to the data switch, for receiving said video ID and new port ID after said new queue timer times out;

said data server accessing a video storage in said data server using said video ID and loading a first page of video data into an A-buffer and second page of video data into a B-buffer and storing a next video storage accessing address;

said data server selectively coupling said A-buffer and said B-buffer to said new port using said new port ID and outputting said video data from said A-buffer to said new port to send said video data as a data stream to said data switch;

said data server outputting said video data from said B-buffer to said new port when said A-buffer is empty and reloading said A-buffer by accessing a next page of video data from said video storage using said next video storage accessing address;

said data server continuing said outputting of said video data from said A-buffer and said B-buffer as a data stream to said data switch until an end of said video data is detected;

said data server sending a termination message through said control server and through said gateway to said data switch to release connections between said new port and subscribers in said network.

14. The system of claim 12, wherein said gateway, further comprises:

a voice response unit for responding with a first response to the subscriber;

said gateway receiving said subscriber ID and video ID from the subscriber and validating said subscriber ID;

said gateway accessing a gateway video catalog using said video ID, to obtain voice response data describing said digital video data and responding a second response to the subscriber with said voice response data.

15. The system of claim 13, wherein said data server further comprises:

a video data selector coupled to a plurality of video data files in said video storage unit, for receiving said video ID and in response thereto, selecting one of said plurality of video data files for coupling to said A-buffer and said B-buffer (A–B buffers);

a multiplexer coupled to a plurality of said ports, for receiving said port ID and in response thereto, selecting one of said plurality of ports for coupling to said A–B buffers;

whereby a selected one of said plurality of video data files can be output to a selected one of said plurality of ports.

16. In a data processing system coupled to a subscriber communications network through a data switch, the system including a gateway coupled to the network, a control server coupled to the gateway and a data server coupled to the control server and to the data switch, a method for providing digital video data on subscriber demand, comprising the steps of:

receiving a demand in the gateway from a subscriber for said digital video data;

sending a subscriber ID and video ID to the control server;

determining that a subscriber queue exists in said control server corresponding to said video ID and that said control server is accepting new subscribers;

assigning said subscriber ID to said subscriber queue and sending a port ID to said gateway;

sending said port ID and subscriber ID to the data switch to connect the identified port to the subscriber;

accessing a video storage in said data server using said video ID and loading a first page of video data into an A-buffer and second page of video data into a B-buffer;

said data server connecting said A-buffer and said B-buffer to said port using said port ID;

outputting said video data from said A-buffer and said B-buffer to said data switch;

sending a termination message from said data server to said data switch to release connections between said port and subscribers in said network.

17. The method of claim 16, wherein said step of determining if a subscriber queue exists in said control server corresponding to said video ID, further comprises the steps of:

determining if a port is available if no subscriber queue exists for said video ID;

creating a new subscriber queue in said control server if a new port having a new port ID is available, starting a new queue timer for adding subscribers to said new subscriber queue and scheduling said video ID for said new port ID at a new start time;

assigning said subscriber ID to new subscriber queue;

sending new port ID and subscriber ID to the data switch to connect said new port to the subscriber;

18. A data processing system coupled to a subscriber communications network through a data switch, for providing digital video data on subscriber demand, comprising:

a gateway coupled to the network, for receiving a request from a subscriber, for said digital video data;

a control server coupled to said gateway, for receiving a subscriber ID and video ID from said gateway and determining if a subscriber queue exists in said control server corresponding to said video ID and is accepting new subscribers;

said control server determining if a port is available if no subscriber queue exists for said video ID and creating a new subscriber queue in said control server if a new port having a new port ID is available, starting a new queue timer for adding subscribers to said new subscriber queue and scheduling said video ID for said new port ID at a new start time;

said control server assigning said subscriber ID to a new subscriber queue;

said control server sending said new port ID and subscriber ID to the data switch to connect said new port to the subscriber.

19. The system of claim 18, which further comprises:

a data server coupled to said control server and to the data switch, for receiving said video ID and new port ID after said new queue timer times out;

said data server accessing a video storage in said data server with said video ID and loading a first page of video data into an A-buffer and second page of video data into a B-buffer;

said data server connecting said A-buffer and said B-buffer to said new port using said new port ID;

said data server outputting of said video data from said A-buffer and said B-buffer serially to said data switch;

said data server sending a termination message to said data switch to release connections between said new port and subscribers in said network.

20. The system of claim 19, wherein said data server further comprises:

a video data selector coupled to a plurality of video data files in said video storage unit, for receiving said video ID and in response thereto, selecting one of said plurality of video data files for coupling to said A-buffer and said B-buffer;

a multiplexer coupled to a plurality of said ports, for receiving said port ID and selecting one of said plurality of ports for coupling to said A-buffer and said B-buffer;

whereby any one of said plurality of said selected video data files can be output to any one of said plurality of ports.

\* \* \* \* \*

UNITED STATES PATENT AND TRADEMARK OFFICE
CERTIFICATE OF CORRECTION

PATENT NO.  : 5,508,732
DATED       : April 16, 1996
INVENTOR(S) : John F. Bottomley et al.

It is certified that error appears in the above-identified patent and that said Letters Patent are hereby corrected as shown below:

| | |
|---|---|
| Col. 16, line 17 | delete lines 17 through 48 in its entirety. |
| Col. 16, line 49 | delete "scriber queue exists for said video ID;". |

Signed and Sealed this

Twenty-fourth Day of September, 1996

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,508,732

DATED : Apr. 16, 1996

INVENTOR(S): John F. Bottomley et al.

It is certified that error appears in the above-identified patent and that said Letters Patent are hereby corrected as shown below:

Col. 15, line 24        "relocating" should be --reloating--.

Signed and Sealed this

Third Day of December, 1996

Attest:

BRUCE LEHMAN

Attesting Officer          Commissioner of Patents and Trademarks